United States Patent
Mehta et al.

(10) Patent No.: US 11,427,225 B2
(45) Date of Patent: *Aug. 30, 2022

(54) ALL MOVER PRIORS

(71) Applicant: UATC, LLC, San Francisco, CA (US)

(72) Inventors: Hersh Mehta, McDonald, PA (US); Eric B. Werner, Hamburg, NY (US); Albert John Biglan, Pittsburgh, PA (US); Galen Clark Haynes, Pittlsburgh, PA (US)

(73) Assignee: UATC, LLC, San Francisco, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/727,654

(22) Filed: Dec. 26, 2019

(65) Prior Publication Data

US 2020/0207369 A1    Jul. 2, 2020

Related U.S. Application Data

(60) Provisional application No. 62/840,165, filed on Apr. 29, 2019, provisional application No. 62/785,052, filed on Dec. 26, 2018.

(51) Int. Cl.
*B60W 60/00* (2020.01)
*G05D 1/02* (2020.01)
*G05D 1/00* (2006.01)
*G06K 9/62* (2022.01)
*G06V 20/56* (2022.01)

(52) U.S. Cl.
CPC .. *B60W 60/00274* (2020.02); *B60W 60/0011* (2020.02); *B60W 60/0016* (2020.02); *B60W 60/00272* (2020.02); *B60W 60/00276* (2020.02); *G05D 1/0088* (2013.01); *G05D 1/0212* (2013.01); *G05D 1/0214* (2013.01); *G06K 9/6221* (2013.01); *G06V 20/56* (2022.01); *B60W 2554/4041* (2020.02); *B60W 2554/80* (2020.02); *B60W 2556/10* (2020.02);
(Continued)

(58) Field of Classification Search
None
See application file for complete search history.

(56) References Cited

U.S. PATENT DOCUMENTS 9,248,834 B1 * 2/2016 Ferguson ............. G05D 1/0088
10,059,334 B1 * 8/2018 Zhu ....................... G05D 1/0214
(Continued)

OTHER PUBLICATIONS

"U.S. Appl. No. 16/727,637, Non Final Office Action dated Sep. 9, 2021", 16 pgs.
(Continued)

*Primary Examiner* — Tamara L Weber
(74) *Attorney, Agent, or Firm* — Schwegman Lundberg & Woessner, P.A.

(57) ABSTRACT

Systems, devices, products, apparatuses, and/or methods for generating a driving path for an autonomous vehicle on a roadway by determining one or more prior probability distributions of one or more motion paths for one or more objects that have previously moved in a geographic location and/or for controlling travel of an autonomous vehicle on a roadway by predicting movement of a detected object according to one or more prior probability distributions of one or more motion paths for one or more objects that have previously moved in a geographic location.

18 Claims, 14 Drawing Sheets

(52) U.S. Cl.
CPC ..... *B60W 2556/40* (2020.02); *B60W 2556/45* (2020.02); *G05D 2201/0213* (2013.01)

(56) References Cited

U.S. PATENT DOCUMENTS

| | | | |
|---|---|---|---|
| 2013/0054106 A1* | 2/2013 | Schmudderich | G06K 9/00805 |
| | | | 701/96 |
| 2020/0156632 A1* | 5/2020 | Ding | G05D 1/0088 |
| 2020/0159215 A1* | 5/2020 | Ding | G06N 3/006 |
| 2020/0189575 A1* | 6/2020 | Wongpiromsarn | B60W 30/09 |
| 2020/0207375 A1 | 7/2020 | Mehta et al. | |

OTHER PUBLICATIONS

"U.S. Appl. No. 16/727,637, Examiner Interview Summary dated Dec. 3, 2021", 2 pgs.

"U.S. Appl. No. 16/727,637, Response filed Dec. 9, 2021 to Non Final Office Action dated Sep. 9, 2021", 13 pgs.

U.S. Appl. No. 16/727,637, filed Dec. 26, 2019, All Mover Priors.

\* cited by examiner

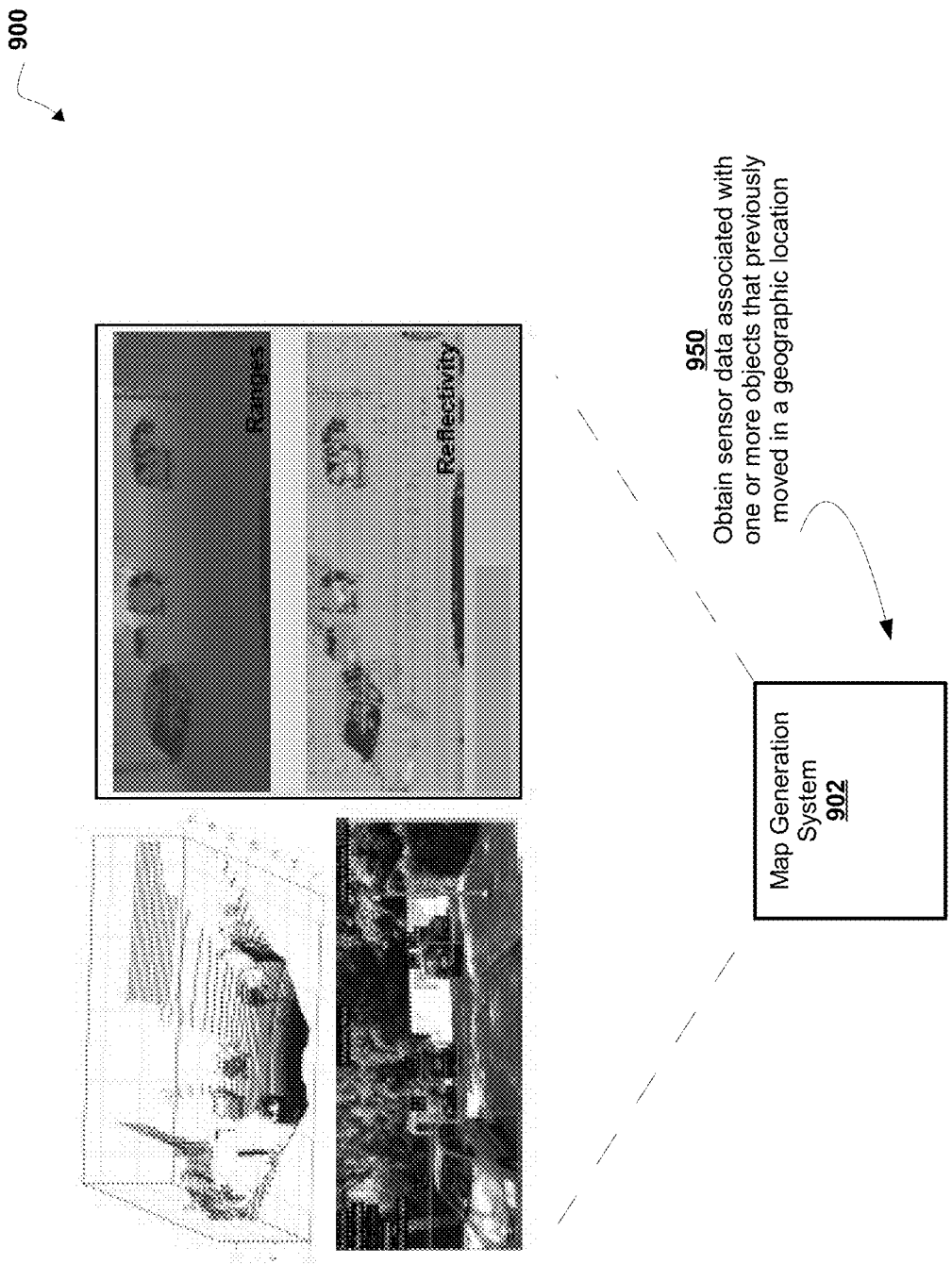

ALL MOVER PRIORS

CROSS REFERENCE TO RELATED APPLICATIONS

This application claims the benefit of U.S. Provisional Application No. 62/785,052, filed Dec. 26, 2018, the entire disclosure of which is hereby incorporated by reference in its entirety and U.S. Provisional Application No. 62/840,165, filed Apr. 29, 2019, the entire disclosure of which is hereby incorporated by reference in its entirety.

BACKGROUND

An autonomous vehicle (e.g., a driverless car, a driverless auto, a self-driving car, a robotic car, etc.) is a vehicle that is capable of sensing an environment of the vehicle and traveling (e.g., navigating, moving, etc.) in the environment without human input. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant traffic signs associated with a route.

SUMMARY

Accordingly, disclosed are systems, devices, products, apparatuses, and/or methods for automated prediction of movement of objects in a roadway.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

Provided are systems, devices, products, apparatuses, and/or methods for improving prediction of movement of objects external to an autonomous vehicle, improving generation of a driving path for an autonomous vehicle, improving control of travel of an autonomous vehicle, and/or the like. According to some non-limiting embodiments or aspects, provided is a method, comprising: obtaining, with a computing system comprising one or more processors, sensor data associated with one or more objects that previously moved in a geographic location; determining, with the computing system, one or more prior probability distributions of one or more motion paths for the one or more objects in the geographic location based on the sensor data; and generating, with the computing system, a driving path including one or more trajectories for an autonomous vehicle on a roadway based on the one or more prior probability distributions.

In some non-limiting embodiments or aspects, determining the one or more prior probability distributions further comprises: detecting a plurality of objects in the geographic location based on the sensor data; and identifying the one or more objects that previously moved in the geographic location from the plurality of objects based on the sensor data.

In some non-limiting embodiments or aspects, determining the one or more prior probability distributions further comprises classifying each object of the one or more objects within one or more predetermined object classes of a plurality of predetermined object classes based on the sensor data. In some non-limiting embodiments or aspects the one or more prior probability distributions are determined based on the one or more predetermined object classes of the plurality of predetermined object classes in which the one or more objects are classified.

In some non-limiting embodiments or aspects, the one or more prior probability distributions are determined based on at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof.

In some non-limiting embodiments or aspects, the one or more prior probability distributions are associated with one or more probability values that correspond to one or more elements of a plurality of elements in a map of the geographic location. In some non-limiting embodiments or aspects, the one or more probability values include one or more probabilities of the one or more objects at one or more positions in the geographic location associated with the one or more elements in the map moving over the one or more motion paths.

In some non-limiting embodiments or aspects, the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

In some non-limiting embodiments or aspects, the method further comprises obtaining, with the computing system, map data associated with the map of the geographic location. The method further comprises generating, with the computing system, the driving path including the one or more trajectories for the autonomous vehicle on the roadway in the map based on the map data and the one or more prior probability distributions.

In some non-limiting embodiments or aspects, the method further comprises obtaining, with the computing system, user input associated with at least one element of the plurality of elements of the map of the geographic location. The method further comprises generating, with the computing system, the driving path including the one or more trajectories for the autonomous vehicle on the roadway in the map based on the map data, the one or more prior probability distributions, and the user input.

In some non-limiting embodiments or aspects, the user input is associated with a first element of the plurality of elements of the map of the geographic location and a second element of the plurality of elements of the map of the geographic location different than the first element, and wherein the driving path is generated on the roadway in the map between the first element and the second element.

According to some non-limiting embodiments or aspects, provided is a computing system comprising: one or more processors programmed and/or configured to: obtain sensor data associated with one or more objects that previously moved in a geographic location; determine one or more prior probability distributions of one or more motion paths for the one or more objects in the geographic location based on the sensor data; and generate a driving path including one or more trajectories for an autonomous vehicle on a roadway based on the one or more prior probability distributions.

In some non-limiting embodiments or aspects, the one or more processors are further programmed and/or configured to determine the one or more prior probability distributions by detecting a plurality of objects that previously moved in the geographic location based on the sensor data. In some non-limiting embodiments or aspects, the one or more processors are further programmed or configured to identify the one or more objects that previously moved in the geographic location from the plurality of objects based on the sensor data.

In some non-limiting embodiments or aspects the one or more processors are further programmed and/or configured to determine the one or more prior probability distributions by: classifying each object of the one or more objects within one or more predetermined object classes of a plurality of predetermined object classes based on the sensor data, wherein the one or more prior probability distributions are determined based on the one or more predetermined object classes of the plurality of predetermined object classes in which the one or more objects are classified.

In some non-limiting embodiments or aspects, the one or more prior probability distributions are determined based on at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof.

In some non-limiting embodiments or aspects the one or more prior probability distributions are associated with one or more probability values that correspond to one or more elements of a plurality of elements in a map of the geographic location, and wherein the one or more probability values include one or more probabilities of the one or more objects at one or more positions in the geographic location associated with the one or more elements in the map moving over the one or more motion paths.

In some non-limiting embodiments or aspects, the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

In some non-limiting embodiments or aspects the one or more processors are further programmed and/or configured to: obtain map data associated with the map of the geographic location. In some non-limiting embodiments or aspects, the one or more processors are further programmed or configured to generate a driving path including the one or more trajectories for the autonomous vehicle on the roadway in the map based on the map data and the one or more prior probability distributions.

In some non-limiting embodiments or aspects, the one or more processors are further programmed or configured to obtain user input associated with at least one element of the plurality of elements of the map of the geographic location. The one or more processors are further programmed or configured to generate the driving path including the one or more trajectories for the autonomous vehicle on the roadway in the map based on the map data, the one or more prior probability distributions, and the user input.

In some non-limiting embodiments or aspects, the user input is associated with a first element of the plurality of elements of the map of the geographic location and a second element of the plurality of elements of the map of the geographic location different than the first element, and wherein the one or more processors are further programmed and/or configured to generate the driving path on the roadway between the first element and the second element.

According to some non-limiting embodiments or aspects, provided is a computer program product including at least one non-transitory computer-readable medium including one or more instructions that, when executed by at least one processor, cause the at least one processor to obtain sensor data associated with one or more objects that previously moved in a geographic location; determine one or more prior probability distributions of one or more motion paths for the one or more objects in the geographic location based on the sensor data; and generate a driving path including one or more trajectories for an autonomous vehicle on a roadway based on the one or more prior probability distributions.

In some non-limiting embodiments or aspects, the one or more prior probability distributions are associated with one or more probability values that correspond to one or more elements of a plurality of elements in a map of the geographic location. In some non-limiting embodiments or aspects, the one or more probability values include one or more probabilities of the one or more objects at one or more positions in the geographic location associated with the one or more elements in the map moving over the one or more motion paths.

According to some non-limiting embodiments or aspects, provided is a method, comprising: obtaining, with a computing system comprising one or more processors, one or more prior probability distributions of one or more motion paths for one or more objects that previously moved in a geographic location; obtaining, with the computing system, sensor data associated with a detected object in an environment surrounding an autonomous vehicle; determining, with the computing system, one or more prediction scores based on the one or more prior probability distributions and the sensor data, wherein the one or more prediction scores include one or more predictions of whether the detected object is moving over at least one motion path of the one or more motion paths; and controlling, with the computer system, travel of the autonomous vehicle on a roadway based on the one or more prediction scores.

In some non-limiting embodiments or aspects, the one or more prior probability distributions are associated with one or more probability values that correspond to one or more elements of a plurality of elements in a map of the geographic location. In some non-limiting embodiments or aspects, one or more probability values include one or more probabilities of the one or more objects at one or more positions in the geographic location associated with the one or more elements in the map moving over the one or more motion paths.

In some non-limiting embodiments or aspects, the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

In some non-limiting embodiments or aspects, the method further comprises obtaining, with the computing system, a driving path including one or more trajectories for the autonomous vehicle on the roadway. The method further comprises controlling, with the computing system, travel of the autonomous vehicle on the roadway based on the one or more trajectories of the driving path and the one or more prediction scores.

In some non-limiting embodiments, the one or more prior probability distributions are associated with one or more predetermined object classes of a plurality of predetermined object classes in which the one or more objects are classified. In some non-limiting embodiments or aspects, the method of determining the one or more prediction scores further comprises: classifying the detected object within at least one predetermined object class of the plurality of predetermined object classes, wherein the one or more prediction scores are determined based on the one or more predetermined object classes of the plurality of predetermined object classes in which the one or more objects are classified and the at least one predetermined object class of the plurality of predetermined object classes in which the detected object is classified.

In some non-limiting embodiments or aspects, the one or more prior probability distributions include at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof. In some non-limiting embodiments or aspects, the method of determining the one or more prediction scores further comprises: determining, for the detected object, at least one detected object probability associated with the at least one condition parameter, wherein the one or more prediction scores are determined based on the at least one prior probability associated with the at least one condition parameter and the at least one detected object probability associated with the at least one condition parameter.

In some non-limiting embodiments or aspects, the one or more prior probability distributions are associated with one or more traversals of the roadway by one or more vehicles before the travel of the autonomous vehicle on the roadway, and wherein the one or more objects moved external to the one or more vehicles during the one or more traversals of the roadway by the one or more vehicles.

According to some non-limiting embodiments or aspects, provided is a computing system comprising: one or more processors programmed and/or configured to: obtain one or more prior probability distributions of one or more motion paths for one or more objects that previously moved in a geographic location; obtain sensor data associated with a detected object in an environment surrounding an autonomous vehicle; determine one or more prediction scores based on the one or more prior probability distributions and the sensor data, wherein the one or more prediction scores include one or more predictions of whether the detected object is moving over at least one motion path of the one or more motion paths; and control travel of the autonomous vehicle on a roadway based on the one or more prediction scores.

In some non-limiting embodiments or aspects, the one or more prior probability distributions are associated with one or more probability values that correspond to one or more elements of a plurality of elements in a map of the geographic location. In some non-limiting embodiments or aspects, the one or more probability values include one or more probabilities of the one or more objects at one or more positions in the geographic location associated with the one or more elements in the map moving over the one or more motion paths.

In some non-limiting embodiments or aspects, the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

In some non-limiting embodiments or aspects, the one or more processors are further programmed or configured to: obtain a driving path including one or more trajectories for the autonomous vehicle on the roadway. In some non-limiting embodiments or aspects, the one or more processors are further programmed or configured to control travel of the autonomous vehicle on the roadway based on the one or more trajectories of the driving path and the one or more prediction scores.

In some non-limiting embodiments or aspects, the one or more prior probability distributions are associated with one or more predetermined object classes of a plurality of predetermined object classes in which the one or more objects are classified and the one or more processors are further programmed and/or configured to determine the one or more prediction scores by: classifying the detected object within at least one predetermined object class of the plurality of predetermined object classes, wherein the one or more prediction scores are determined based on the one or more predetermined object classes of the plurality of predetermined object classes in which the one or more objects are classified and the at least one predetermined object class of the plurality of predetermined object classes in which the detected object is classified.

In some non-limiting embodiments or aspects, the one or more prior probability distributions include at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof, and the one or more processors are further programmed and/or configured to determine the one or more prediction scores by: determining, for the detected object, at least one detected object probability associated with the at least one condition parameter, wherein the one or more prediction scores are determined based on the at least one prior probability associated with the at least one condition parameter and the at least one detected object probability associated with the at least one condition parameter.

According to some non-limiting embodiments or aspects, provided is an autonomous vehicle comprising: one or more sensors for detecting objects in an environment surrounding the autonomous vehicle; and a vehicle computing system comprising one or more processors, wherein the vehicle computing system is programmed and/or configured to: obtain one or more prior probability distributions of one or more motion paths for one or more objects that previously moved in a geographic location; obtain, from the one or more sensors, sensor data associated with a detected object in the environment surrounding the autonomous vehicle; determine one or more prediction scores based on the one or more prior probability distributions and the sensor data, wherein the one or more prediction scores include one or more predictions of whether the detected object is moving over at least one motion path of the one or more motion paths; and control travel of the autonomous vehicle on a roadway based on the one or more prediction scores.

In some non-limiting embodiments or aspects, the one or more prior probability distributions are associated with one or more probability values that correspond to one or more elements of a plurality of elements in a map of the geographic location, wherein the one or more probability values include one or more probabilities of the one or more objects at one or more positions in the geographic location associated with the one or more elements in the map moving over the one or more motion paths.

In some non-limiting embodiments or aspects, the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

In some non-limiting embodiments or aspects, the vehicle computing system is further programmed or configured to obtain a driving path including one or more trajectories for the autonomous vehicle on the roadway; and control travel of the autonomous vehicle on the roadway based on the one or more trajectories of the driving path and the one or more prediction scores.

In some non-limiting embodiments or aspects, the one or more prior probability distributions are associated with one or more predetermined object classes of a plurality of predetermined object classes in which the one or more objects are classified, and wherein the vehicle computing system is further programmed and/or configured to determine the one or more prediction scores by: classifying the detected object within at least one predetermined object class of the plurality of predetermined object classes, wherein the one or more prediction scores are determined based on the one or more predetermined object classes of the plurality of predetermined object classes in which the one or more objects are classified and the at least one predetermined object class of the plurality of predetermined object classes in which the detected object is classified.

In some non-limiting embodiments or aspects, the one or more prior probability distributions include at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof, and wherein the one or more processors are further programmed and/or configured to determine the one or more prediction scores by: determining, for the detected object, at least one detected object probability associated with the at least one condition parameter, wherein the one or more prediction scores are determined based on the at least one prior probability associated with the at least one condition parameter and the at least one detected object probability associated with the at least one condition parameter.

In some non-limiting embodiments or aspects, the one or more prior probability distributions are associated with one or more traversals of the roadway by one or more vehicles before the travel of the autonomous vehicle on the roadway, and wherein the one or more objects moved external to the one or more vehicles during the one or more traversals of the roadway by the one or more vehicles.

Further non-limiting embodiments or aspects are set forth in the following numbered clauses:

Clause 1: A method, comprising: obtaining, with a computing system comprising one or more processors, sensor data associated with one or more objects that previously moved in a geographic location; determining, with the computing system, one or more prior probability distributions of one or more motion paths for the one or more objects in the geographic location based on the sensor data; and generating, with the computing system, a driving path including one or more trajectories for an autonomous vehicle on a roadway based on the one or more prior probability distributions.

Clause 2: The method of clause 1, wherein determining the one or more prior probability distributions further comprises: detecting a plurality of objects in the geographic location based on the sensor data; and identifying the one or more objects that previously moved in the geographic location from the plurality of objects based on the sensor data.

Clause 3: The method of any of clauses 1 or 2, wherein determining the one or more prior probability distributions further comprises: classifying each object of the one or more objects within one or more predetermined object classes of a plurality of predetermined object classes based on the sensor data, wherein the one or more prior probability distributions are determined based on the one or more predetermined object classes of the plurality of predetermined object classes in which the one or more objects are classified.

Clause 4: The method of any of clauses 1-3, wherein the one or more prior probability distributions are determined based on at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof.

Clause 5: The method of any of clauses 1-4, wherein the one or more prior probability distributions are associated with one or more probability values that correspond to one or more elements of a plurality of elements in a map of the geographic location, and wherein the one or more probability values include one or more probabilities of the one or more objects at one or more positions in the geographic location associated with the one or more elements in the map moving over the one or more motion paths.

Clause 6: The method of any of clauses 1-5, wherein the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

Clause 7: The method of any of clauses 1-5, further comprising: obtaining, with the computing system, map data associated with the map of the geographic location; and generating, with the computing system, the driving path including the one or more trajectories for the autonomous vehicle on the roadway in the map based on the map data and the one or more prior probability distributions.

Clause 8: The method of any of clauses 1-7, further comprising: obtaining, with the computing system, user input associated with at least one element of the plurality of elements of the map of the geographic location; and generating, with the computing system, the driving path including the one or more trajectories for the autonomous vehicle on the roadway in the map based on the map data, the one or more prior probability distributions, and the user input.

Clause 9: The method of any of clauses 1-8, wherein the user input is associated with a first element of the plurality of elements of the map of the geographic location and a second element of the plurality of elements of the map of the geographic location different than the first element, and wherein the driving path is generated on the roadway in the map between the first element and the second element.

Clause 10: A computing system comprising: one or more processors programmed and/or configured to: obtain sensor data associated with one or more objects that previously moved in a geographic location; determine one or more prior probability distributions of one or more motion paths for the one or more objects in the geographic location based on the sensor data; and generate a driving path including one or more trajectories for an autonomous vehicle on a roadway based on the one or more prior probability distributions.

Clause 11: The computing system of clause 10, wherein the one or more processors are further programmed and/or configured to determine the one or more prior probability distributions by: detecting a plurality of objects that previously moved in the geographic location based on the sensor data; and identifying the one or more objects that previously moved in the geographic location from the plurality of objects based on the sensor data.

Clause 12: The computing system of any of clauses 10 or 11, wherein the one or more processors are further programmed and/or configured to determine the one or more prior probability distributions by: classifying each object of the one or more objects within one or more predetermined object classes of a plurality of predetermined object classes based on the sensor data, wherein the one or more prior probability distributions are determined based on the one or more predetermined object classes of the plurality of predetermined object classes in which the one or more objects are classified.

Clause 13: The computing system of any of clauses 10-12, wherein the one or more prior probability distributions are determined based on at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof.

Clause 14: The computing system of any of clauses 10-13, wherein the one or more prior probability distributions are associated with one or more probability values that correspond to one or more elements of a plurality of elements in a map of the geographic location, and wherein the one or more probability values include one or more probabilities of the one or more objects at one or more positions in the geographic location associated with the one or more elements in the map moving over the one or more motion paths.

Clause 15: The computing system of any of clauses 10-14, wherein the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

Clause 16: The computing system of any of clauses 10-15, wherein the one or more processors are further programmed and/or configured to: obtain map data associated with the map of the geographic location; and generate a driving path including the one or more trajectories for the autonomous vehicle on the roadway in the map based on the map data and the one or more prior probability distributions.

Clause 17: The computing system of any of clauses 10-16, wherein the one or more processors are further programmed and/or configured to: obtain user input associated with at least one element of the plurality of elements of the map of the geographic location; and generate the driving path including the one or more trajectories for the autonomous vehicle on the roadway in the map based on the map data, the one or more prior probability distributions, and the user input.

Clause 18: The computing system of any of clauses 10-17, wherein the user input is associated with a first element of the plurality of elements of the map of the geographic location and a second element of the plurality of elements of the map of the geographic location different than the first element, and wherein the one or more processors are further programmed and/or configured to generate the driving path on the roadway between the first element and the second element.

Clause 19: A computer program product comprising at least one non-transitory computer-readable medium including program instructions that, when executed by at least one processor, cause the at least one processor to: obtain sensor data associated with one or more objects that previously moved in a geographic location; determine one or more prior probability distributions of one or more motion paths for the one or more objects in the geographic location based on the sensor data; and generate a driving path including one or more trajectories for an autonomous vehicle on a roadway based on the one or more prior probability distributions.

Clause 20: The computer program product of clause 19, wherein the one or more prior probability distributions are associated with one or more probability values that correspond to one or more elements of a plurality of elements in a map of the geographic location, and wherein the one or more probability values include one or more probabilities of the one or more objects at one or more positions in the geographic location associated with the one or more elements in the map moving over the one or more motion paths.

Clause 21: A computer-implemented method comprising: obtaining, with a computing system comprising one or more processors, one or more prior probability distributions of one or more motion paths for one or more objects that previously moved in a geographic location; obtaining, with the computing system, sensor data associated with a detected object in an environment surrounding an autonomous vehicle; determining, with the computing system, one or more prediction scores based on the one or more prior probability distributions and the sensor data, wherein the one or more prediction scores include one or more predictions of whether the detected object is moving over at least one motion path of the one or more motion paths; and controlling, with the computer system, travel of the autonomous vehicle on a roadway based on the one or more prediction scores.

Clause 22: The method of clause 21, wherein the one or more prior probability distributions are associated with one or more probability values that correspond to one or more elements of a plurality of elements in a map of the geographic location, wherein the one or more probability values include one or more probabilities of the one or more objects at one or more positions in the geographic location associated with the one or more elements in the map moving over the one or more motion paths.

Clause 23: The method of any of clauses 21 or 22, wherein the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

Clause 24: The method of any of clauses 21-23, further comprising: obtaining, with the computing system, a driving path including one or more trajectories for the autonomous vehicle on the roadway; and controlling, with the computing system, travel of the autonomous vehicle on the roadway based on the one or more trajectories of the driving path and the one or more prediction scores.

Clause 25: The method of any of clauses 21-24, wherein the one or more prior probability distributions are associated with one or more predetermined object classes of a plurality of predetermined object classes in which the one or more objects are classified, and wherein determining the one or more prediction scores further comprises: classifying the detected object within at least one predetermined object class of the plurality of predetermined object classes, wherein the one or more prediction scores are determined based on the one or more predetermined object classes of the plurality of predetermined object classes in which the one or more objects are classified, and the at least one predetermined object class of the plurality of predetermined object classes in which the detected object is classified.

Clause 26: The method of any of clauses 21-25, wherein the one or more prior probability distributions include at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof, and wherein determining the one or more prediction scores further comprises: determining, for the detected object, at least one detected object probability associated with the at least one condition parameter, wherein the one or more prediction scores are determined based on the at least one prior probability associated with the at least one condition parameter and the at least one detected object probability associated with the at least one condition parameter.

Clause 27: The method of any of clauses 21-26, wherein the one or more prior probability distributions are associated with one or more traversals of the roadway by one or more vehicles before the travel of the autonomous vehicle on the roadway, and wherein the one or more objects moved external to the one or more vehicles during the one or more traversals of the roadway by the one or more vehicles.

Clause 28: A computing system comprising: one or more processors programmed and/or configured to: obtain one or more prior probability distributions of one or more motion paths for one or more objects that previously moved in a geographic location; obtain sensor data associated with a detected object in an environment surrounding an autonomous vehicle; determine one or more prediction scores based on the one or more prior probability distributions and the sensor data, wherein the one or more prediction scores include one or more predictions of whether the detected object is moving over at least one motion path of the one or more motion paths; and control travel of the autonomous vehicle on a roadway based on the one or more prediction scores.

Clause 29: The computing system of clause 28, wherein the one or more prior probability distributions are associated with one or more probability values that correspond to one or more elements of a plurality of elements in a map of the geographic location, wherein the one or more probability values include one or more probabilities of the one or more objects at one or more positions in the geographic location associated with the one or more elements in the map moving over the one or more motion paths.

Clause 30: The computing system of any of clauses 28 or 29, wherein the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

Clause 31: The computing system of any of clauses 28-30, wherein the one or more processors are further programmed and/or configured to: obtain a driving path including one or more trajectories for the autonomous vehicle on the roadway; and control travel of the autonomous vehicle on the roadway based on the one or more trajectories of the driving path and the one or more prediction scores.

Clause 32: The computing system of any of clauses 28-31 wherein the one or more prior probability distributions are associated with one or more predetermined object classes of a plurality of predetermined object classes in which the one or more objects are classified, and wherein the one or more processors are further programmed and/or configured to determine the one or more prediction scores by: classifying the detected object within at least one predetermined object class of the plurality of predetermined object classes, wherein the one or more prediction scores are determined based on the one or more predetermined object classes of the plurality of predetermined object classes in which the one or more objects are classified, and the at least one predetermined object class of the plurality of predetermined object classes in which the detected object is classified.

Clause 33: The computing system of any of clauses 28-32, wherein the one or more prior probability distributions include at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof, and wherein the one or more processors are further programmed and/or configured to determine the one or more prediction scores by: determining, for the detected object, at least one detected object probability associated with the at least one condition parameter, wherein the one or more prediction scores are determined based on the at least one prior probability associated with the at least one condition parameter and the at least one detected object probability associated with the at least one condition parameter.

Clause 34: An autonomous vehicle comprising: one or more sensors for detecting objects in an environment surrounding the autonomous vehicle; a vehicle computing system comprising one or more processors, wherein the vehicle computing system is programmed and/or configured to: obtain one or more prior probability distributions of one or more motion paths for one or more objects that previously moved in a geographic location; obtain, from the one or more sensors, sensor data associated with a detected object in the environment surrounding the autonomous vehicle; determine one or more prediction scores based on the one or more prior probability distributions and the sensor data, wherein the one or more prediction scores include one or more predictions of whether the detected object is moving over at least one motion path of the one or more motion paths; and control travel of the autonomous vehicle on a roadway based on the one or more prediction scores.

Clause 35: The autonomous vehicle of clause 34, wherein the one or more prior probability distributions are associated with one or more probability values that correspond to one or more elements of a plurality of elements in a map of the geographic location, wherein the one or more probability values include one or more probabilities of the one or more objects at one or more positions in the geographic location associated with the one or more elements in the map moving over the one or more motion paths.

Clause 36: The autonomous vehicle of any of clauses 34 or 35, wherein the one or more probability values further include at least one probability associated with at least one of the following: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof.

Clause 37: The autonomous vehicle of any of clauses 34-36, wherein the vehicle computing system is further programmed and/or configured to: obtain a driving path including one or more trajectories for the autonomous vehicle on the roadway; and control travel of the autonomous vehicle on the roadway based on the one or more trajectories of the driving path and the one or more prediction scores.

Clause 38: The autonomous vehicle of any of clauses 34-37, wherein the one or more prior probability distributions are associated with one or more predetermined object classes of a plurality of predetermined object classes in which the one or more objects are classified, and wherein the vehicle computing system is further programmed and/or configured to determine the one or more prediction scores by: classifying the detected object within at least one predetermined object class of the plurality of predetermined object classes, wherein the one or more prediction scores are determined based on the one or more predetermined object classes of the plurality of predetermined object classes in which the one or more objects are classified, and the at least one predetermined object class of the plurality of predetermined object classes in which the detected object is classified.

Clause 39: The autonomous vehicle of any of clauses 34-38, wherein the one or more prior probability distributions include at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof, and wherein the one or more processors are further programmed and/or configured to determine the one or more prediction scores by: determining, for the detected object, at least one detected object probability associated with the at least one condition parameter, wherein the one or more prediction scores are determined based on the at least one prior probability associated with the at least one condition parameter and the at least one detected object probability associated with the at least one condition parameter.

Clause 40: The autonomous vehicle of any of clauses 34-39, wherein the one or more prior probability distributions are associated with one or more traversals of the roadway by one or more vehicles before the travel of the autonomous vehicle on the roadway, and wherein the one or more objects moved external to the one or more vehicles during the one or more traversals of the roadway by the one or more vehicles.

BRIEF DESCRIPTION OF THE DRAWINGS

Additional advantages and details of the invention are explained in greater detail below with reference to the exemplary embodiments or aspects that are illustrated in the accompanying schematic figures, in which:

FIGS. 9A-9E are diagrams of an implementation of one or more processes disclosed herein.

DETAILED DESCRIPTION

Figure 1:
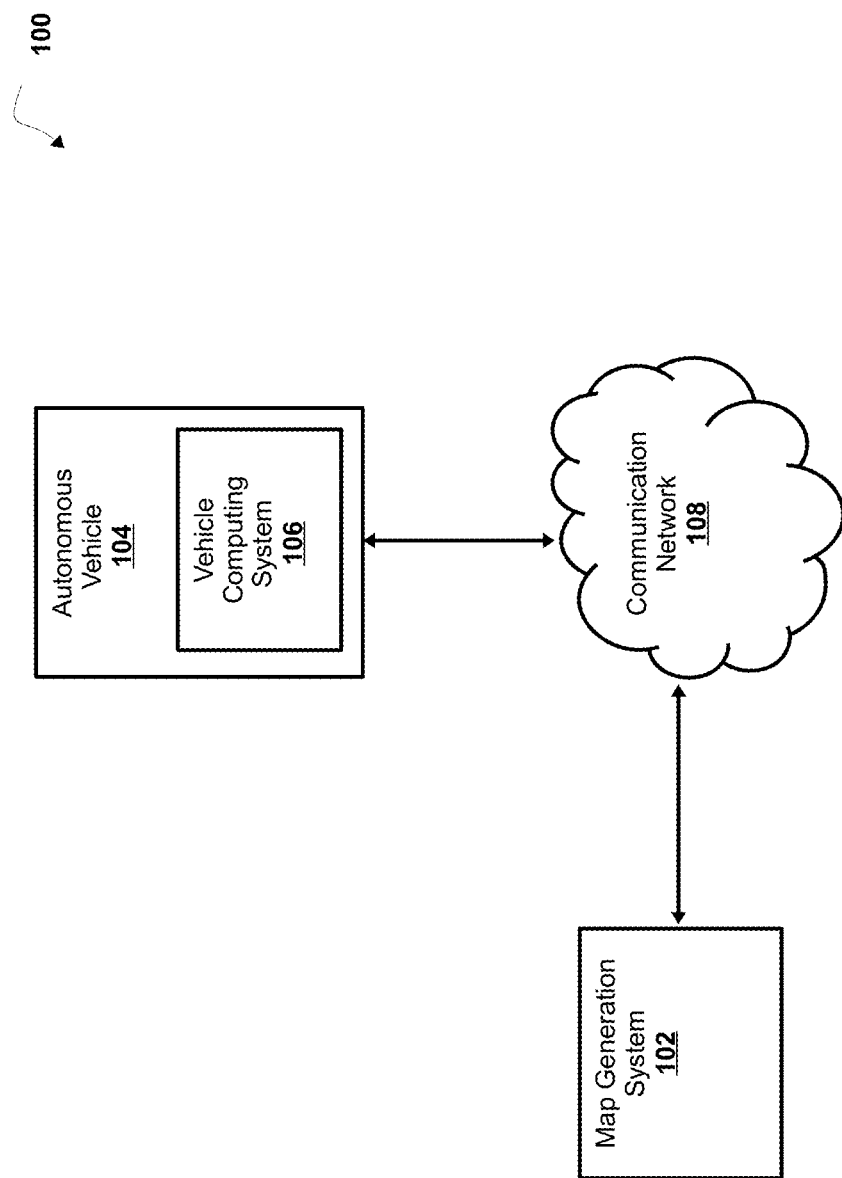
FIG. 1 is a diagram of a non-limiting embodiment or aspect of an environment in which systems, devices, products, apparatuses, and/or methods, described herein, can be implemented.

It is to be understood that the present disclosure may assume various alternative variations and step sequences, except where expressly specified to the contrary. It is also to be understood that the specific devices and processes illustrated in the attached drawings and described in the following specification are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment may constitute a "system" or a "computing system".

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

A driving path includes one or more trajectories an autonomous vehicle should follow to safely traverse a roadway in the absence of any dynamic constraints. A driving path may be associated with a map of a geographic location including the roadway. In such an example, the driving path may be generated based on static attributes and/or images of the roadway, such as a road edge of a road including the roadway, an intersection, connection, or link of the road with another road, a lane of the roadway, objects in proximity to and/or within the road, and/or the like. As an example, a computer system and/or a human mapper can generate a driving path between points or locations in the map of the geographic location including the roadway by applying a set of rules or constraints that dictate how to draw the driving path in the roadway with respect to the static attributes and/or images of the roadway. For example, a driving path may define a path of travel on a roadway for an autonomous vehicle that follows or obeys each of the rules or constraints (e.g., the path of travel does not cross a yellow line, etc.) associated with the attributes of the roadway. In such an example, an autonomous vehicle that travels over or follows the driving path (e.g., that travels on the roadway without deviating from the driving path, etc.) may obey each of the rules or constraints (e.g., does not cross the yellow line, etc.) associated with the attributes of the roadway.

However, such static attributes and/or images of a roadway may not sufficiently capture a notion of where an autonomous vehicle should drive on the roadway and/or may not provide sufficient information to accurately predict movement of other objects detected during traversal of the roadway. For example, a path of a non-autonomous, human operated vehicle that travels on the roadway may be different than a driving path generated in a map based on the static attributes and/or images of the roadway. As an example, a human operator of a vehicle can draw on or remember his previous experiences driving on the same roadway to determine a path for a current traversal of the roadway and/or to more accurately predict movement of other objects detected during traversal of the roadway. In such an example, various objects (e.g., vehicles, pedestrians, bicyclists, etc.) that may move within the geographic location may not obey each of the rules or constraints associated with the attributes of the roadway. For example, a pedestrian may move in the roadway outside of and/or across a painted line or lines defining a crosswalk (e.g., jaywalk, etc.), a vehicle may cut a corner traversing an intersection (e.g., cross a yellow line defining the intersection, etc.), and/or the like. In such an example, the human operator can determine the path for the current traversal of the roadway and/or more accurately predict movement of other objects detected during traversal of the roadway using his knowledge of how the various objects have previously moved within the geographic location including the roadway and, thus, how objects currently within the geographic location (e.g., the vehicle of the human operator, other vehicles, pedestrians, bicyclists, etc.) may be expected to move. Accordingly, provided are systems, devices, products, apparatuses, and/or methods for improving prediction of movement of objects external to an autonomous vehicle, improving generation of a driving path for an autonomous vehicle, improving control of travel of an autonomous vehicle, and/or the like.

Existing computer systems have no mechanism for determining, providing, and/or using knowledge of how prior objects have moved within a geographic location to generate a driving path for an autonomous vehicle in a roadway. Further, existing autonomous vehicles have no mechanism for determining, providing, and/or using knowledge of how prior objects have moved within a geographic location to predict movement of objects detected during traversal of the roadway by the autonomous vehicle. Accordingly, existing computer systems may not generate driving paths that accurately reflect where a vehicle should drive on a roadway, and existing autonomous vehicles may less accurately predict movement of detected objects for controlling travel of the autonomous vehicles.

Non-limiting embodiments or aspects of the present disclosure are directed to systems, devices, products, apparatuses, and/or methods for generating a driving path for an autonomous vehicle by obtaining sensor data associated with one or more objects that previously moved in a geographic location, determining one or more prior probability distributions of one or more motion paths for the one or more objects in the geographic location based on the sensor data, and/or generating a driving path including one or more trajectories for an autonomous vehicle on a roadway based on the one or more prior probability distributions. In this way, a driving path can be generated for an autonomous vehicle on a roadway by determining one or more prior probability distributions of one or more motion paths for one or more objects that have previously moved in a geographic location, which can provide for generation of driving paths that more accurately reflect where a vehicle should drive on a roadway (e.g., safer driving paths, more natural and/or human-like driving paths, more efficient driving paths, etc.).

Non-limiting embodiments or aspects of the present disclosure are directed to systems, devices, products, apparatuses, and/or methods for controlling travel of an autonomous vehicle by obtaining one or more prior probability distributions of one or more motion paths for one or more objects that previously moved in a geographic location, obtaining sensor data associated with a detected object in an environment surrounding an autonomous vehicle, determining one or more prediction scores based on the one or more prior probability distributions and the sensor data, the one or more prediction scores including one or more predictions of whether the detected object is moving over at least one motion path of the one or more motion paths, and controlling travel of the autonomous vehicle on a roadway based on the one or more prediction scores. In this way, travel of an autonomous vehicle on a roadway can be controlled by predicting movement of a detected object according to one or more prior probability distributions of one or more motion paths for one or more objects that have previously moved in a geographic location, which can provide for safer, more natural or human-like, and/or more efficient autonomous control of an autonomous vehicle during traversal of the roadway by the autonomous vehicle, and/or the like.

Referring now to FIG. 1, FIG. 1 is a diagram of an example environment 100 in which devices, systems, methods, and/or products described herein, may be implemented. As shown in FIG. 1, environment 100 includes map generation system 102, autonomous vehicle 104 including vehicle computing system 106, and communication network 108. Systems and/or devices of environment 100 can interconnect via wired connections, wireless connections, or a combination of wired and wireless connections.

In some non-limiting embodiments or aspects, map generation system 102 includes one or more devices capable of receiving information and/or data from autonomous vehicle 104 (e.g., vehicle computing system 106, etc.) via communication network 108 and/or communicating information and/or data to autonomous vehicle 104 (e.g., vehicle computing system 106, etc.) via communication network 108. For example, map generation system 102 may provide one or more prior probability distributions (e.g., one or more mover priors, etc.) and/or one or more driving paths to autonomous vehicle 104, and/or map generation system 102 may receive sensor data from autonomous vehicle 104. As an example, map generation system 102 can include one or more computing systems including one or more processors (e.g., one or more servers, etc.).

In some non-limiting embodiments or aspects, autonomous vehicle 104 (e.g., vehicle computing system 106, etc.) includes one or more devices capable of receiving information and/or data from map generation system 102 via communication network 108 and/or communicating information and/or data to map generation system 102 via communication network 108. For example, autonomous vehicle 104 can include one or more sensors that includes one or more devices for generating sensor data within the surrounding environment of autonomous vehicle 104. As an example, one or more sensors can collect sensor data that includes data points that correspond to objects within the surrounding environment of autonomous vehicle 104. For example, data points within one or more representations of sensor data (e.g., a cell, a pixel, an element, etc.), can be used to identify object(s) of interest and/or parameters by the map generation system 102. For example, autonomous vehicle 104 can include one or more computing systems including one or more processors (e.g., one or more servers, etc.). As an example, autonomous vehicle 104 (e.g., vehicle computing system 106, etc.) includes one or more devices capable of controlling travel, operation, and/or routing of autonomous vehicle 104 based on map data, feature data, position data, state data, sensor data, one or more prior probability distributions, one or more driving paths, and/or the like. In such an example, the one or more devices may control travel and one or more functionalities associated with a fully autonomous mode of autonomous vehicle 104 on a roadway, based on the map data, feature data, position data, state data, sensor data, the one or more prior probability distributions, the one or more driving paths, and/or the like, for example, by controlling the one or more devices (e.g., a device that controls acceleration, a device that controls steering, a device that controls braking, an actuator that controls gas flow, etc.) of autonomous vehicle 104 based on map data, feature data, position data, state data, sensor data, one or more prior probability distributions, one or more driving paths, and/or the like. Further details regarding non-limiting embodiments of autonomous vehicle 104 are provided below with regard to FIG. 2.

In some non-limiting embodiments or aspects, map generation system 102 and/or autonomous vehicle 104 include one or more devices capable of receiving, storing, and/or providing map data (e.g., map data, an evidence map layer, AV map data, coverage map data, hybrid map data, submap data, Uber's Hexagonal Hierarchical Spatial Index (H3) data, Google's S2 geometry data, etc.) associated with a map (e.g., a map, a submap, an AV map, a coverage map, a hybrid map, an H3 cell, an S2 cell, etc.) of a geographic location (e.g., a country, a state, a city, a portion of a city, a township, a portion of a township, etc.). For example, maps can be used for routing autonomous vehicle 104 on a roadway specified in the map.

In some non-limiting embodiments or aspects, a road refers to a paved or otherwise improved path between two places that allows for travel by a vehicle (e.g., autonomous vehicle 104, etc.). Additionally or alternatively, a road includes a roadway and a sidewalk in proximity to (e.g., adjacent, near, next to, touching, etc.) the roadway. In some non-limiting embodiments or aspects, a roadway includes a portion of road on which a vehicle is intended to travel and is not restricted by a physical barrier or by separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane from which a vehicle turns), and/or the like. In some non-limiting embodiments or aspects, a roadway is connected to another roadway, for example a lane of a roadway is connected to another lane of the roadway and/or a lane of the roadway is connected to a lane of another roadway.

In some non-limiting embodiments or aspects, a roadway is associated with map data that defines one or more attributes of (e.g., metadata associated with) the roadway (e.g., attributes of a roadway in a geographic location, attributes of a segment of a roadway, attributes of a lane of a roadway, attributes of an edge of a roadway, attributes of a driving path of a roadway, etc.). In some non-limiting embodiments or aspects, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), a centerline of a roadway (e.g., an indication of a centerline path in at least one lane of the roadway for controlling autonomous vehicle 104 during operation (e.g., following, traveling, traversing, routing, etc.) on a driving path, a driving path of a roadway (e.g., one or more trajectories that autonomous vehicle 104 can traverse in the roadway and an indication of the location of at least one feature in the roadway a lateral distance from the driving path, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like. In some non-limiting embodiments or aspects, a map of a geographic location includes one or more routes that include one or more roadways. In some non-limiting embodiments or aspects, map data associated with a map of the geographic location associates each roadway of the one or more roadways with an indication of whether an autonomous can travel on that roadway.

In some non-limiting embodiments or aspects, a driving path includes one or more trajectories for autonomous vehicle 104 on a roadway. For example, a driving path may include trajectories autonomous vehicle 104 can follow while also determining dynamic features of the roadway (e.g., a section of curb, a marker, an object, etc.) to autonomously determine when to safely adjust (e.g., deviate from a driving path, etc.) the driving path to avoid objects in the roadway and/or feature data associated with lateral regions (e.g., left and right edges of a lane in the roadway, etc.) of the driving path. As an example, a driving path may include a trajectory (e.g., a spline, a polyline, etc.), a location of features (e.g., real objects, paint markers, curbs, other lane paths, etc.) in the roadway, or a link for transitioning between an entry point and an end point of the driving path based on at least one of heading information, curvature information, acceleration information and/or the like.

In some non-limiting embodiments or aspects, communication network 108 includes one or more wired and/or wireless networks. For example, communication network 108 includes a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices, and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
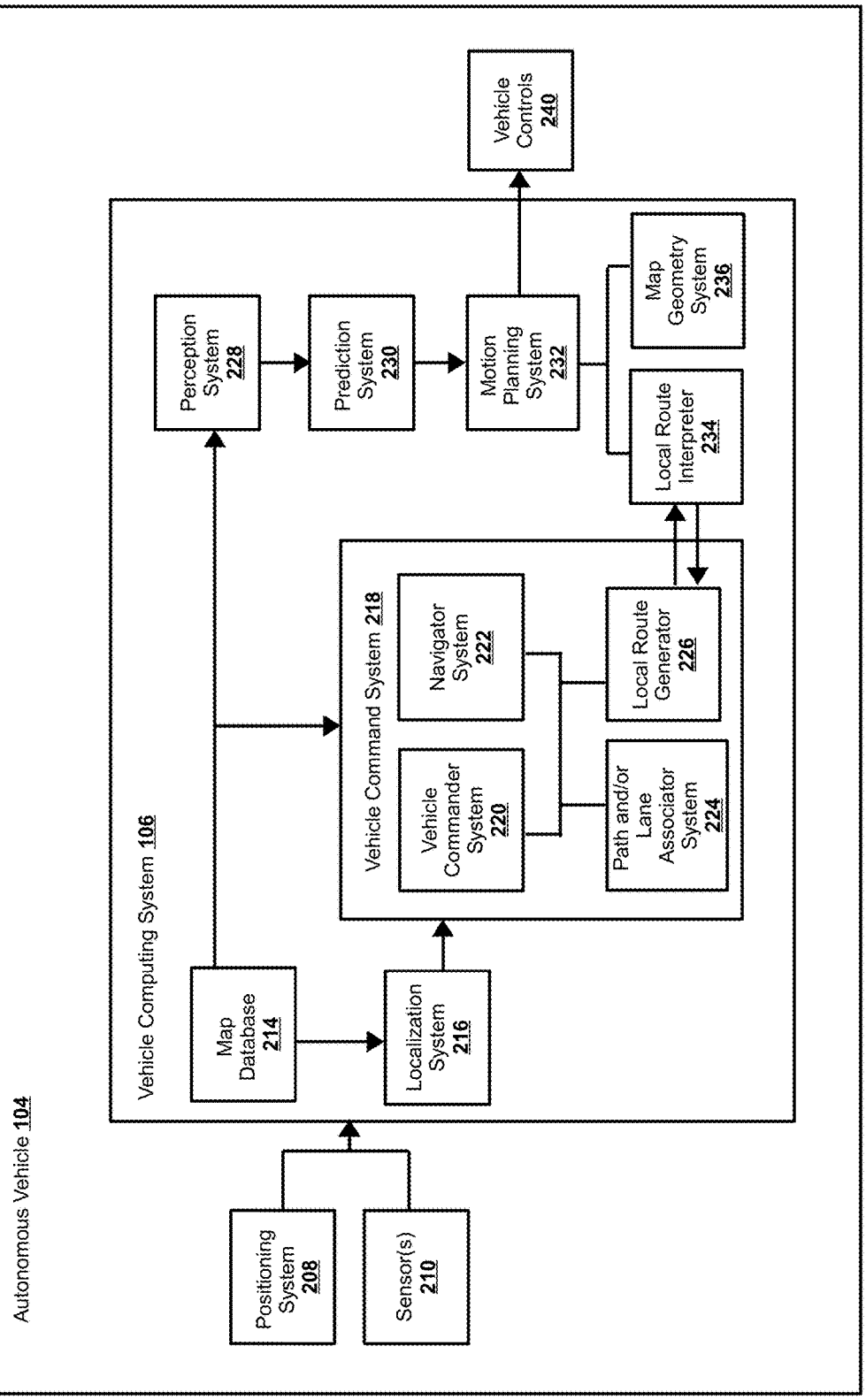
FIG. 2 is a diagram of a non-limiting embodiment or aspect of a system for controlling an autonomous vehicle shown in FIG. 1.

Referring now to FIG. 2, FIG. 2 is a diagram of a non-limiting embodiment or aspect of a system 200 for controlling autonomous vehicle 104. As shown in FIG. 2, vehicle computing system 106 includes vehicle command system 218, perception system 228, prediction system 230, motion planning system 232, local route interpreter 234, and map geometry system 236 that cooperate to perceive a surrounding environment of autonomous vehicle 104, determine a motion plan of autonomous vehicle 104 based on the perceived surrounding environment, and control the motion (e.g., the direction of travel) of autonomous vehicle 104 based on the motion plan.

In some non-limiting embodiments or aspects, vehicle computing system 106 is connected to or includes positioning system 208. In some non-limiting embodiments or aspects, positioning system 208 determines a position (e.g., a current position, a past position, etc.) of autonomous vehicle 104. In some non-limiting embodiments or aspects, positioning system 208 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments or aspects, the position of autonomous vehicle 104 is used by vehicle computing system 106.

In some non-limiting embodiments or aspects, vehicle computing system 106 receives sensor data from one or more sensors 210 that are coupled to or otherwise included in autonomous vehicle 104. For example, one or more sensors 210 includes a Light Detection and Ranging (LIDAR) system, a Radio Detection and Ranging (RADAR) system, one or more cameras (e.g., visible spectrum cameras, infrared cameras, etc.), and/or the like. In some non-limiting embodiments or aspects, the sensor data includes data that describes a location of objects within the surrounding environment of autonomous vehicle 104. In some non-limiting embodiments or aspects, one or more sensors 210 collect sensor data that includes data that describes a location (e.g., in three-dimensional space relative to autonomous vehicle 104) of points that correspond to objects within the surrounding environment of autonomous vehicle 104.

In some non-limiting embodiments or aspects, the sensor data includes a location (e.g., a location in three-dimensional space relative to the LIDAR system) of a number of points (e.g., a point cloud) that correspond to objects that have reflected a ranging laser. In some non-limiting embodiments or aspects, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments or aspects, map data includes LIDAR point cloud maps associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments or aspects, the sensor data includes a location (e.g., a location in three-dimensional space relative to the RADAR system) of a number of points that correspond to objects that have reflected a ranging radio wave. In some non-limiting embodiments or aspects, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments or aspects, the RADAR system provides information about the location and/or the speed of an object relative to the RADAR system based on the radio waves.

In some non-limiting embodiments or aspects, image processing techniques (e.g., range imaging techniques, as an example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments or aspects, map database 214 provides detailed information associated with the map, features of the roadway in the geographic location, and information about the surrounding environment of autonomous vehicle 104 for autonomous vehicle 104 to use while driving (e.g., traversing a route, planning a route, determining a motion plan, controlling autonomous vehicle 104, etc.).

In some non-limiting embodiments or aspects, vehicle computing system 106 receives a vehicle pose from localization system 216 based on one or more sensors 210 that are coupled to or otherwise included in autonomous vehicle 104. In some non-limiting embodiments or aspects, localization system 216 includes a LIDAR localizer, a low quality pose localizer, and/or a pose filter. For example, the localization system 216 uses a pose filter that receives and/or determines one or more valid pose estimates (e.g., not based on invalid position data, etc.) from the LIDAR localizer and/or the low quality pose localizer, for determining a map-relative vehicle pose. For example, low quality pose localizer determines a low quality pose estimate in response to receiving position data from positioning system 208 for operating (e.g., routing, navigating, controlling, etc.) autonomous vehicle 104 under manual control (e.g., in a coverage lane, on a coverage driving path, etc.). In some non-limiting embodiments or aspects, LIDAR localizer determines a LIDAR pose estimate in response to receiving sensor data (e.g., LIDAR data, RADAR data, etc.) from sensors 210 for operating (e.g., routing, navigating, controlling, etc.) autonomous vehicle 104 under autonomous control (e.g., in an AV lane, on an AV driving path, etc.).

In some non-limiting embodiments or aspects, vehicle command system 218 includes vehicle commander system 220, navigator system 222, path and/or lane associator system 224, and local route generator 226 that cooperate to route and/or navigate autonomous vehicle 104 in a geographic location. In some non-limiting embodiments or aspects, vehicle commander system 220 provides tracking of a current objective of autonomous vehicle 104, such as a current service, a target pose, a coverage plan (e.g., development testing, etc.), and/or the like. In some non-limiting embodiments or aspects, navigator system 222 determines and/or provides a route plan (e.g., a route between a starting location or a current location and a destination location, etc.) for autonomous vehicle 104 based on a current state of autonomous vehicle 104, map data (e.g., lane graph, driving paths, etc.), and one or more vehicle commands (e.g., a target pose). For example, navigator system 222 determines a route plan (e.g., a plan, a re-plan, a deviation from a route plan, etc.) including one or more lanes (e.g., current lane, future lane, etc.) and/or one or more driving paths (e.g., a current driving path, a future driving path, etc.) in one or more roadways that autonomous vehicle 104 can traverse on a route to a destination location (e.g., a target location, a trip drop-off location, etc.).

In some non-limiting embodiments or aspects, navigator system 222 determines a route plan based on one or more lanes and/or one or more driving paths received from path and/or lane associator system 224. In some non-limiting embodiments or aspects, path and/or lane associator system 224 determines one or more lanes and/or one or more driving paths of a route in response to receiving a vehicle pose from localization system 216. For example, path and/or lane associator system 224 determines, based on the vehicle pose, that autonomous vehicle 104 is on a coverage lane and/or a coverage driving path, and in response to determining that autonomous vehicle 104 is on the coverage lane and/or the coverage driving path, determines one or more candidate lanes (e.g., routable lanes, etc.) and/or one or more candidate driving paths (e.g., routable driving paths, etc.) within a distance of the vehicle pose associated with autonomous vehicle 104. For example, path and/or lane associator system 224 determines, based on the vehicle pose, that autonomous vehicle 104 is on an AV lane and/or an AV driving path, and in response to determining that autonomous vehicle 104 is on the AV lane and/or the AV driving path, determines one or more candidate lanes (e.g., routable lanes, etc.) and/or one or more candidate driving paths (e.g., routable driving paths, etc.) within a distance of the vehicle pose associated with autonomous vehicle 104. In some non-limiting embodiments or aspects, navigator system 222 generates a cost function for each of the one or more candidate lanes and/or the one or more candidate driving paths that autonomous vehicle 104 may traverse on a route to a destination location. For example, navigator system 222 generates a cost function that describes a cost (e.g., a cost over a time period) of following (e.g., adhering to) one or more lanes and/or one or more driving paths that may be used to reach the destination location (e.g., a target pose, etc.).

In some non-limiting embodiments or aspects, local route generator 226 generates and/or provides route options that may be processed and control travel of autonomous vehicle 104 on a local route. For example, navigator system 222 may configure a route plan, and local route generator 226 may generate and/or provide one or more local routes or route options for the route plan. For example, the route options may include one or more options for adapting the motion of the AV to one or more local routes in the route plan (e.g., one or more shorter routes within a global route between the current location of the AV and one or more exit locations located between the current location of the AV and the destination location of the AV, etc.). In some non-limiting embodiments or aspects, local route generator 226 may determine a number of route options based on a predetermined number, a current location of the AV, a current service of the AV, and/or the like.

In some non-limiting embodiments or aspects, perception system 228 detects and/or tracks objects (e.g., vehicles, pedestrians, bicycles, and the like) that are proximate to (e.g., in proximity to the surrounding environment of) autonomous vehicle 104 over a time period. In some non-limiting embodiments or aspects, perception system 228 can retrieve (e.g., obtain) map data from map database 214 that provides detailed information about the surrounding environment of autonomous vehicle 104.

In some non-limiting embodiments or aspects, perception system 228 determines one or more objects that are proximate to autonomous vehicle 104 based on sensor data received from one or more sensors 210 and/or map data from map database 214. For example, perception system 228 determines, for the one or more objects that are proximate, state data associated with a state of such an object. In some non-limiting embodiments or aspects, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape, such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments or aspects, perception system 228 determines state data for an object over a number of iterations of determining state data. For example, perception system 228 updates the state data for each object of a plurality of objects during each iteration.

In some non-limiting embodiments or aspects, prediction system 230 receives the state data associated with one or more objects from perception system 228. Prediction system 230 predicts one or more future locations for the one or more objects based on the state data. For example, prediction system 230 predicts the future location of each object of a plurality of objects within a time period (e.g., 5 seconds, 10 seconds, 20 seconds, etc.). In some non-limiting embodiments or aspects, prediction system 230 predicts future movement of an object according to a probability class of the objects, one or more conditions, one or more observed locations of the object, and/or map data. For example, prediction system 230 predicts a future movement of an object according to one or more prior probability distributions including mover classifications, one or more motion paths, and/or one or more driving paths based on the detection of the object and/or movement of the object.

In some non-limiting embodiments or aspects, prediction system 230 predicts that an object will adhere to the object's direction of travel according to the speed of the object. In some non-limiting embodiments or aspects, prediction system 230 uses machine learning techniques or modeling techniques to make a prediction based on state data associated with an object.

In some non-limiting embodiments or aspects, motion planning system 232 determines a motion plan for autonomous vehicle 104 based on a prediction of a location associated with an object provided by prediction system 230 and/or based on state data associated with the object provided by perception system 228. For example, motion planning system 232 determines a motion plan (e.g., an optimized motion plan) for autonomous vehicle 104 that causes autonomous vehicle 104 to travel relative to the object based on the prediction of the location for the object provided by prediction system 230 and/or the state data associated with the object provided by perception system 228.

In some non-limiting embodiments or aspects, motion planning system 232 receives a route plan as a command from navigator system 222. In some non-limiting embodiments or aspects, motion planning system 232 determines a cost function for one or more motion plans of a route for autonomous vehicle 104 based on the locations and/or predicted locations of one or more objects. For example, motion planning system 232 determines the cost function that describes a cost (e.g., a cost over a time period) of following (e.g., adhering to) a motion plan (e.g., a selected motion plan, an optimized motion plan, etc.). In some non-limiting embodiments or aspects, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments or aspects, motion planning system 232 determines a cost of following a motion plan. For example, motion planning system 232 determines a motion plan for autonomous vehicle 104 based on one or more cost functions. In some non-limiting embodiments or aspects, motion planning system 232 determines a motion plan (e.g., a selected motion plan, an optimized motion plan, a preferred motion plan, etc.) that minimizes a cost function. In some non-limiting embodiments or aspects, motion planning system 232 provides a motion plan to vehicle controls 240 (e.g., a device that controls acceleration, a device that controls steering, a device that controls braking, an actuator that controls gas flow, etc.) to implement the motion plan.

In some non-limiting embodiments or aspects, motion planning system 232 can determine a motion plan for autonomous vehicle 104 based on the predicted future locations and/or motion paths for the object provided by the prediction system 230 and/or the state data for the object provided by the perception system 228. Stated differently, given information about current locations of objects and/or predicted future locations and/or motion paths of objects, the motion planning system 232 can determine a motion plan for autonomous vehicle 104 that navigates autonomous vehicle 104 relative to the objects at such locations according to the cost function.

In some non-limiting embodiments or aspects, motion planning system 232 communicates with local route interpreter 234 and map geometry system 236. In some non-limiting embodiments or aspects, local route interpreter 234 may receive and/or process route options from local route generator 226. For example, local route interpreter 234 may determine a new or updated route for travel of autonomous vehicle 104. As an example, one or more lanes and/or one or more driving paths in a local route may be determined by local route interpreter 234 and map geometry system 236. For example, local route interpreter 234 can determine a route option and map geometry system 236 determines one or more lanes and/or one or more driving paths in the route option for determining the motion of autonomous vehicle 104.

Figure 3:
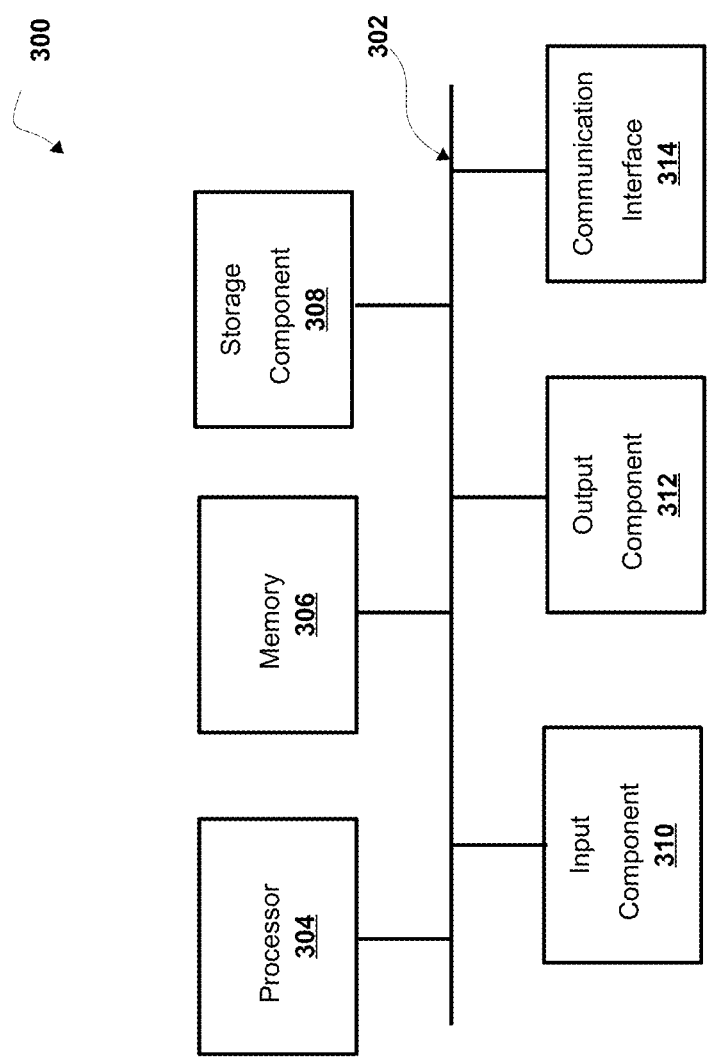
FIG. 3 is a diagram of a non-limiting embodiment or aspect of components of one or more devices and/or one or more systems of FIGS. 1 and 2.

Referring now to FIG. 3, FIG. 3 is a diagram of example components of a device 300. Device 300 can correspond to one or more devices of map generation system 102 and/or one or more devices of (e.g., one or more devices of a system of) autonomous vehicle 104. In some non-limiting embodiments or aspects, one or more devices of map generation system 102 and/or one or more devices of (e.g., one or more devices of a system of) autonomous vehicle 104 can include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments or aspects, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 can permit device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

Memory 306 and/or storage component 308 may include data storage or one or more data structures (e.g., a database, etc.). Device 300 may be capable of receiving information from, storing information in, communicating information to, or searching information stored in the data storage or one or more data structures in memory 306 and/or storage component 308. In some non-limiting embodiments or aspects, the information may include data (e.g., sensor data, one or more prior probability distributions, etc.) associated with one or more traversals of a roadway by one or more vehicles.

The number and arrangement of components shown in FIG. 3 are provided as an example. In some non-limiting embodiments or aspects, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
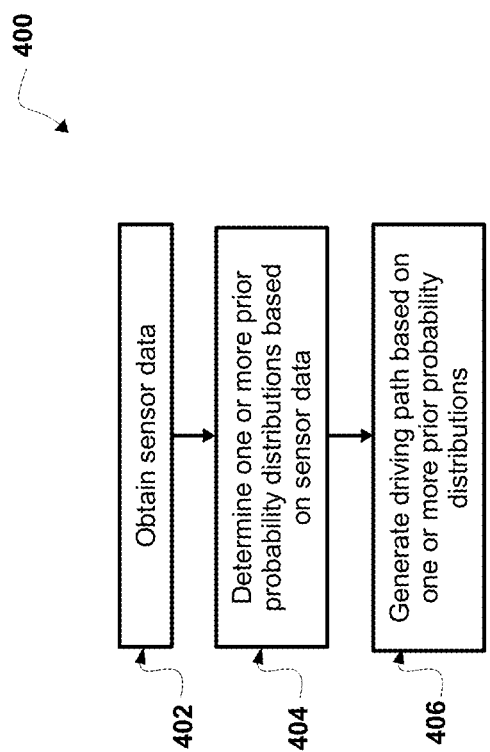
FIG. 4 is a flowchart of a non-limiting embodiment or aspect of a process for generating a driving path.

Referring now to FIG. 4, FIG. 4 is a flowchart of a non-limiting embodiment or aspect of a process 400 for generating a driving path. In some non-limiting embodiments or aspects, one or more of the steps of process 400 are performed (e.g., completely, partially, etc.) by map generation system 102 (e.g., one or more devices of map generation system 102, etc.). In some non-limiting embodiments or aspects, one or more of the steps of process 400 are performed (e.g., completely, partially, etc.) by another device or a group of devices separate from or including map generation system 102, such as one or more device of (e.g., one or more devices of a system of) autonomous vehicle 104.

As shown in FIG. 4, at step 402, process 400 includes obtaining sensor data. For example, map generation system 102 obtains sensor data. As an example, map generation system 102 obtains (e.g., receives, retrieves, etc.) sensor data associated with one or more objects that previously moved in a geographic location.

In some non-limiting embodiments or aspects, an object may be an object that is capable of moving (e.g., an object that previously moved, a currently moving object, an object that may move in the future, etc.). For example, an object that is capable of moving may include an actor or a mover. As an example, an actor or a mover may include various different types or classes of objects that are capable of moving, such as a vehicle, a pedestrian, a bicycle, and/or the like. In such an example, a particular type or class of actor or mover may include various different sub-types or sub-classes of that actor or mover. For example, a vehicle may include various different types or classes of vehicles, such as, a car, a truck, a bus, and/or the like. In such an example, a type or a class of object may be associated with a predetermined set of rules or constraints that an object of that type or class should follow or obey when moving (e.g., is predicted to follow or obey when moving, is associated with a probability of following or obeying when moving, etc.). For example, a first type or a first class of object may be associated with a first predetermined set of rules or constraints different than a second predetermined set of rules or constraints associated with a second type or a second class of object. As an example, a vehicle may be associated with different probabilities for movement with respect to a crosswalk than a pedestrian. In some non-limiting embodiments or aspects, an object may be a static object (e.g., a non-moving object, an object that is not capable of moving, etc.). For example, a static object may include road markings (e.g., yellow lines, crosswalks, etc.), a sign (e.g., a stop sign, etc.), a curb, a building, and/or the like.

In some non-limiting embodiments or aspects, sensor data is collected by autonomous vehicles and/or non-autonomous, human controlled vehicles as the vehicles travel on a roadway in a geographic region. For example, the sensor data may be collected by vehicles (e.g., a map collection vehicle, etc.) during travel specifically for collecting data for mapping and/or during normal (e.g., non-mapping specific, etc.) autonomy operations. As an example, when vehicles travel in the world, sensor(s) 210 can log sensor data (e.g., LIDAR point clouds, video logs from the cameras, etc.) in vehicle logs, and the sensor data in the vehicle logs can be collected, stored, and/or aggregated together by map generation system 102.

As shown in FIG. 4, at step 404, process 400 includes determining one or more prior probability distributions based on sensor data. For example, map generation system 102 determines one or more prior probability distributions based on sensor data. As an example, map generation system 102 determines one or more prior probability distributions of one or more motion paths (e.g., one or more trajectories, one or more paths traversed, etc.) for the one or more objects in the geographic location based on the sensor data. In some non-limiting embodiments or aspects, map generation system 102 provides the one or more prior probability distributions to autonomous vehicle 104.

In some non-limiting embodiments or aspects, map generation system 102 determines a prior probability distribution based on a machine learning technique (e.g., a pattern recognition technique, a data mining technique, a heuristic technique, a supervised learning technique, an unsupervised learning technique, etc.). For example, map generation system 102 generates a model (e.g., an estimator, a classifier, a prediction model, a detector model, etc.) based on a machine learning algorithm (e.g., a decision tree algorithm, a gradient boosted decision tree algorithm, a neural network algorithm, a convolutional neural network algorithm, etc.).

In some non-limiting embodiments or aspects, in response to receipt of sensor data (e.g., sensor data, such as LIDAR point clouds, video logs from cameras, and/or the like collected by one or more vehicles during one or more traversals of a roadway in a geographic location, etc.), the model can be trained to provide an output. For example, map generation system 102 (e.g., one or more models of map generation system 102, etc.) can be trained to generate a classification and/or a condition parameterization for data points within one or more representations of sensor data (e.g., a cell, a pixel, an element, etc.), which can identify detected object(s) of interest and/or condition parameters thereof as an output of the machine-learned model.

In some non-limiting embodiments or aspects, classification can include a class prediction for each cell as corresponding to a particular predetermined class of object (e.g., a vehicle, a pedestrian, a bicycle, no object, etc.) of a plurality of predetermined classes of objects and/or a condition parameter prediction for each cell as corresponding to a particular condition parameter (e.g., a time of day, a season, a city, etc.) associated with the cell.

For example, map generation system 102 may use condition parameters to segment probability distributions across multiple dimensions associated with the condition parameters to provide different levels of information to autonomous vehicle 104 depending on when and/or where autonomous vehicle 104 is traveling. Map generation system 102 may generate a conditional dimension based on user input (e.g., if deemed useful by a human mapper, if deemed useful by a human operator of autonomous vehicle 104, etc.) and/or a determination that sufficient sensor data (e.g., an amount of sensor data associated with the conditional dimension, etc.) supports segmenting a probability dimension with respect to the condition parameter. For example, a time of day condition parameter can distinguish different probability distributions in certain regions where prior probability distributions may change depending on the time of day (e.g. school zones, core-arteries going into/out of a major metropolitan city, suburban neighborhoods. etc.), such as, for example, during school hours when many pedestrians (e.g., students, parents, etc.) are present in school zones, during rush-hour when many vehicles travel in a city, during rush hour when many vehicles travel through a tunnel and/or bridge, during a Sunday morning when few people travel in a neighborhood, and/or the like. In another example, map generation system 102 may use a seasonal condition parameter to segment probability distributions. A season (e.g., Spring, Winter, Summer, Fall, a predetermined number of days during a predetermined time of year, such as college spring break season, and/or the like, etc.) may be associated with a period of time when pedestrians are more likely to be more active or less active, depending on a geographic location, such as, for example, in geographic locations in which tourists visit during particular seasons, thereby increasing a probability of jaywalkers, and/or the like. In some examples, map generation system 102 may use a geographic region (e.g., a city, etc.) based condition parameter to segment probability distributions across different geographic regions (e.g., different cities, etc.) in which drivers, pedestrians, bicyclists, and/or the like, have different movement patterns based on the geographic region (e.g., San Francisco drivers may be associated with probability distributions, motion paths, and/or movement patterns that are different than New York City drivers, etc.). As an example, large cities and/or particularly congested cities may be associated with probability distributions, motion paths, and/or movement patterns of movers that may be more aggressive and less likely to follow the rules of the road in contrast to probability distributions, motion paths, and/or movement patterns of movers in other cities (e.g., smaller cities, less congested cities, etc.). In such an example, by capturing these tendencies or probabilities of movers across dimensions of a condition parameter, map generation system 102 may generate prior probability distributions for different geographic regions (e.g., cities, etc.), which may enable autonomous vehicle 104 (e.g., vehicle computing system 106, etc.) to operate in a manner that is agnostic to a geographic region by operating according to a different prior probability distribution during operations in different geographic regions.

In some non-limiting embodiments or aspects, classification and/or condition parameterization can include a probability score associated with the class prediction for each cell and/or a probability score associated with the condition parameter prediction for each cell. Such a probability score can provide a quantifiable value (e.g., a percentage from 0-100, a value from 0.0-1.0, etc.) indicating a probability that a given cell includes a particular identified classification and/or a particular identified condition parameterization. For example, if classification for a given cell predicts that the cell contains a pedestrian, an associated probability score may indicate that the pedestrian classification is determined to be about 80% accurate. As an example, if condition parameterization for the given cell predicts a time of day of 2 o'clock PM, an associated probability score may indicate that the time of day condition parameter is determined to be about 98% accurate.

In some non-limiting embodiments or aspects, map generation system 102 can train the machine-learned model based on a set of training data. For example, the training data can include a large number of previously obtained representations of sensor data and corresponding labels that describe corresponding objects detected within such sensor data representations including bounding shapes for such detected objects. As an example, a detector training dataset can include a first portion of data corresponding to one or more representations of sensor data (e.g., LIDAR data, etc.) originating from a LIDAR system or one or more other sensors associated with a vehicle (e.g., an autonomous vehicle, a non-autonomous vehicle, etc.). In such an example, the sensor data (e.g., LIDAR data, etc.) can, for example, be recorded while a vehicle is traversing a roadway in a geographic region. For example, the detector training dataset can include a second portion of data corresponding to labels identifying corresponding objects detected within each portion of input sensor data. In some non-limiting embodiments or aspects, the labels can include at least a bounding shape corresponding to each detected object of interest. In some implementations, the labels can additionally include a classification for each object of interest from a predetermined set of objects (e.g., one or more of a pedestrian, a vehicle, or a bicycle, and/or the like) and/or a condition parameterization (e.g., a velocity, a time of day, etc.). The labels included within the second portion of data within the detector training dataset can be manually annotated, automatically annotated, or annotated using a combination of automatic labeling and manual labeling.

More particularly, in some implementations, detecting objects of interest and/or condition parameters associated therewith within a representation of LIDAR data can include determining one or more cell statistics characterizing the LIDAR data corresponding to each cell. In some examples, the one or more cell statistics can include, for example, one or more parameters associated with a distribution of LIDAR data points projected onto each cell. For instance, such parameters can include the number of LIDAR data points projected onto each cell, the average, variance, range, minimum and/or maximum value of a parameter for each LIDAR data point, and/or the like. In some examples, the one or more cell statistics can include, for example, one or more parameters associated with a power or intensity of LIDAR data points projected onto each cell.

In some non-limiting embodiments or aspects, detecting objects within a first representation of LIDAR data via a detector model can include determining a feature extraction vector for each cell based at least in part on the one or more cell statistics for that cell. Additionally, or alternatively, a feature extraction vector for each cell can be based at least in part on the one or more cell statistics for surrounding cells. More particularly, in some examples, a feature extraction vector aggregates one or more cell statistics of surrounding cells at one or more different scales. For example, a first scale can correspond to a first group of cells that includes only a given cell. Cell statistics for the first group of cells (e.g., the given cell) can be calculated, a function can be determined based on those cell statistics, and the determined function can be included in a feature extraction vector. A second scale can correspond to a second group of cells that includes the given cell as well as a subset of cells surrounding the given cell. Cell statistics for the second group of cells can be calculated, a function can be determined based on those cell statistics, and the determined function can be appended to the feature extraction vector. A third scale can correspond to a third group of cells that includes the given cell as well as a subset of cells surrounding the given cell, wherein the third group of cells is larger than the second group of cells. Cell statistics for the third group of cells can be calculated, a function can be determined based on those cell statistics, and the determined function can be appended to the feature extraction vector. This process can be continued for a predetermined number of scales until the predetermined number has been reached. Such a multi-scale technique for extracting features can be advantageous in detecting objects of interest having different sizes (e.g., vehicles versus pedestrians).

In some non-limiting embodiments or aspects, map generation system 102 determines one or more prior probability distributions by first identifying sensor data (e.g., LIDAR point cloud, camera imagery logs, etc.) associated with a particular geographic region (e.g., a cell, a submap, etc.). For example, the identified sensor data may be stored as a chunk of sensor data (e.g., a plurality of chunks, etc.) associated with a length of a roadway in the geographic region. Map generation system 102 may further divide the chunk of sensor data into one or more segments based on the length of roadway associated with the chunk. For example, the map generation system 102 generates one or more segments of sensor data associated with a predetermined length of the roadway (e.g., a segment of car-length distance (roughly 4.95 meters), etc.).

In some non-limiting embodiments or aspects, map generation system 102 inputs the one or more segments into a model. For example, the model reads the sensor data (e.g., LIDAR point-cloud data and associated camera imagery, etc.) from the one or more segments, as well as state data of the collection vehicle associated with the sensor data. In some non-limiting embodiments or aspects, map generation system 102 inputs the one or more segments associated with the chunk of sensor data into a model. In some examples, multiple instances of a model may be generated to receive and process separate chunks. In some non-limiting embodiments or aspects, map generation system 102 includes an aggregator to process the outputs of the model. For example, the aggregator may geo-spatially aggregate the output of the model into a visual map (e.g. a heat map, an evidence data layer of a map, etc.), a database (e.g., a map database, a map production database, etc.), a non-transitory computer readable medium (e.g., an interface definition language, etc.), one or more data points (e.g., an indexed cell, pixel, element, etc.) and/or the like. In some non-limiting embodiments or aspects, the aggregator of map generation system 102 determines output for a geo-spatial area of the map, including one or more detected objects, one or more motion paths, one or more driving paths, one or more probability distributions, one or more bounding boxes of a detected object, one or more classifications of a detected object, and/or the like. In some non-limiting embodiments or aspects, the output may be further processed after it is stored by map generation system 102, such as, for example, during map production for validation, updates (e.g., editing driving paths that are determined invalid, etc.), and testing. In some non-limiting embodiments or aspects, map generation system 102 aggregates outputs across multiple cells to track an object, a driving path, and/or motion path. For example, map generation system 102 detects a unique signature of an object in the outputs that may be used to geo-spatially track the object in the outputs to create a driving path and/or motion path in a map.

In some non-limiting embodiments or aspects, map generation system 102 inputs one or more updated segments into a model. For example, as more autonomous vehicles traverse the geographic region, additional sensor data can be collected and used to dynamically update the previous outputs. In some non-limiting embodiments or aspects, the additional sensor data can build a further representation of the various updated motion paths (e.g., motion paths of vehicles, pedestrians, bicycles, etc.) detected to navigate the roadway. Map generation system 102 may aggregate updated outputs into the previous output, which enables autonomous vehicle 104 to use the aggregated/updated outputs to make more informed predictions about the movements of objects with respect to autonomous vehicle 104.

Further details regarding non-limiting embodiments of step 404 of process 400 are provided below with regard to FIG. 5.

As shown in FIG. 4, at step 406, process 400 includes generating a driving path based on one or more prior probability distributions. For example, map generation system 102 generates a driving path based one or more prior probability distributions. As an example, map generation system 102 generates a driving path including one or more trajectories for autonomous vehicle 104 on a roadway based on the one or more prior probability distributions. In some non-limiting embodiments or aspects, map generation system 102 provides the driving path to autonomous vehicle 104

In some non-limiting embodiment or aspects, the geographic location in which the one or more objects associated with the sensor data previously moved includes the roadway on which map generation system 102 generates the driving path. In some non-limiting embodiment or aspects, the geographic location in which the one or more objects associated with the sensor data previously moved may not include the roadway on which map generation system 102 generates the driving path.

Further details regarding non-limiting embodiments of step 406 of process 400 are provided below with regard to FIG. 6.

Figure 5:
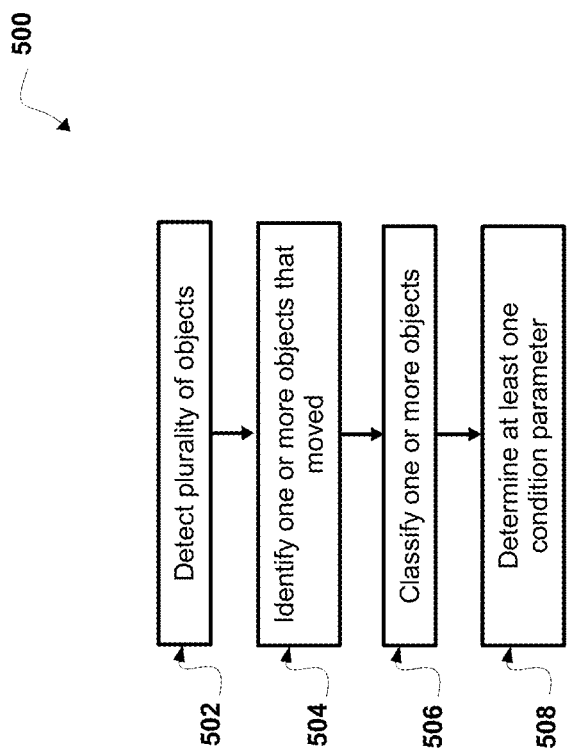
FIG. 5 is a flowchart of a non-limiting embodiment or aspect of a process for generating a driving path.

Referring now to FIG. 5, FIG. 5 is a flowchart of a non-limiting embodiment or aspect of a process 500 for generating a driving path. In some non-limiting embodiments or aspects, one or more of the steps of process 500 are performed (e.g., completely, partially, etc.) by map generation system 102 (e.g., one or more devices of map generation system 102, etc.). In some non-limiting embodiments or aspects, one or more of the steps of process 500 are performed (e.g., completely, partially, etc.) by another device or a group of devices separate from or including map generation system 102, such as one or more device of (e.g., one or more devices of a system of) autonomous vehicle 104.

As shown in FIG. 5, at step 502, process 500 includes detecting a plurality of objects. For example, map generation system 102 detects a plurality of objects. As an example, map generation system 102 detects a plurality of objects in the geographic location based on the sensor data.

In some non-limiting embodiments or aspects, map generation system 102 may process the sensor data or log data using a detector model including a detection algorithm for detecting objects of interest (e.g., the plurality of objects, etc.). For example, the model of map generation system 102 can be configured and/or trained for both the detection of potential objects of interest and generation of a bounding shape and/or parameters used to define a bounding shape. In such examples, output of the model can also include bounding shapes and/or related parameters for each cell or for a subset of selected cells. Example bounding shapes can be 2D bounding shapes (e.g., bounding boxes or other polygons) or 3D bounding shapes (e.g., prisms or other shapes). Example parameters associated with bounding shapes can include, for example, center, orientation, width, height, other dimensions, and the like, which can be used to define a bounding shape. For example, map generation system 102 can use a Lidar-CNN (LiCNN) deep-neural-network architecture as disclosed by V. Vaquero, A. Sanfeliu, and F. Moreno-Noguer in the paper titled "Deep lidar CNN to understand the dynamics of moving vehicles", (2018 IEEE International Conference on Robotics and Automation, 2018, Brisbane, Australia, pp. 4504-4509), the contents of which is hereby incorporated by reference in its entirety, to detect the plurality of objects, classifications associated with the plurality of objects, condition parameterizations associated with the plurality of objects, and/or the like. In some non-limiting embodiments or aspects, map generation system 102 can use various other models or bounding-box detectors such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks. In some non-limiting embodiments or aspects, to train the detector model, map generation system 102 can input a first portion of data corresponding to one or more representations of sensor data (e.g., LIDAR data) originating from a LIDAR system associated with an autonomous vehicle. The sensor data (e.g., LIDAR data) can, for example, be recorded while an autonomous vehicle (e.g., one or more autonomous vehicles, a mapping vehicle, etc.) is in navigational operation. The detector training dataset can further include a second portion of data corresponding to labels identifying corresponding objects detected within each portion of input sensor data. In some implementations, the labels can include at least a bounding shape corresponding to each detected object of interest. In some implementations, the labels can additionally include a classification for each object of interest from a predetermined set of objects including one or more of a pedestrian, a vehicle, or a bicycle. The labels included within the second portion of data within the detector training dataset can be manually annotated, automatically annotated, or annotated using a combination of automatic labeling and manual labeling.

In some non-limiting embodiments or aspects, to train the detector model, map generation system 102 can input a first portion of a set of ground-truth data (e.g., a first portion of a detector training dataset corresponding to the one or more representations of sensor data) into the detector model(s) to be trained. In response to receipt of such a first portion, the detector model outputs bounding shapes, classifications, and/or condition parameterizations for objects of interest detected within the sensor data representations. This output of the detector model predicts the remainder of the set of ground-truth data (e.g., a second portion of the detector training dataset). After such a prediction, the model trainer can apply or otherwise determine a loss function that compares the bounding shapes, object classifications, and/or condition parameterizations output by the detector model to the remainder of the ground-truth data which the detector model attempted to predict. The map generation system 102 can provide backward propagation of the loss function (e.g., backpropagation) through the detector model to train the detector model (e.g., by modifying one or more weights associated with the detector model). This process of inputting ground-truth data, determining a loss function, and backward propagation of the loss function through the detector model can be repeated numerous times as part of training the detector model. For example, the process can be repeated for each of numerous sets of ground-truth data provided within the detector training dataset.

As shown in FIG. 5, at step 504, process 500 includes identifying one or more objects that moved. For example, map generation system 102 identifies one or more objects that moved. As an example, map generation system 102 identifies the one or more objects that previously moved in the geographic location from the plurality of objects based on the sensor data.

In some non-limiting embodiments or aspects, map generation system 102 can apply a filtration step to the plurality of objects, which distinguishes static objects (e.g., cars parked on the side of the road, etc.) from objects that move (e.g., cars driving down the road, etc.) in the plurality of objects. For example, map generation system 102 can run the detector model (e.g., the LiCNN detector, etc.) through each key-frame (e.g., each LIDAR sweep, each camera frame in a video log, etc.) across an entire section or time series of a log of sensor data for the geographic location. For each object detection, map generation system 102 can project a 3D bounding box of the detection into the orthonormal top-down view, and accumulate the detections across all key-frames in a given log of sensor data, and across all logs of sensor data for that geographic location in space. As an example, map generation system 102 can apply learnable parameters (e.g., a weight, a bias, etc.) such as probabilities or confidence scores to the output of the model, which may ensure that the data accurately reflects the confidence level of the model.

As shown in FIG. 5, at step 506, process 500 includes classifying one or more objects. For example, map generation system 102 classifies one or more objects. As an example, map generation system 102 classifies each object of the one or more objects within one or more predetermined object classes of a plurality of predetermined object classes based on the sensor data. In such an example, the one or more prior probability distributions can be determined based on the one or more predetermined object classes of the plurality of predetermined object classes in which the one or more objects are classified.

As shown in FIG. 5, at step 508, process 500 includes determining at least one condition parameter. For example, map generation system 102 determines at least one condition parameter. As an example, map generation system 102 determines at least one condition parameter based on the sensor data.

In some non-limiting embodiments or aspects, the one or more prior probability distributions are determined based on at least one prior probability associated with at least one condition parameter of the following plurality of condition parameters: one or more velocities associated with the one or more objects, one or more acceleration and/or deceleration rates associated with the one or more objects, one or more orientations associated with the one or more objects, a time of day associated with the sensor data, a date associated with the sensor data, a geographic region of a plurality of geographic regions including the geographic location, or any combination thereof.

Figure 6:
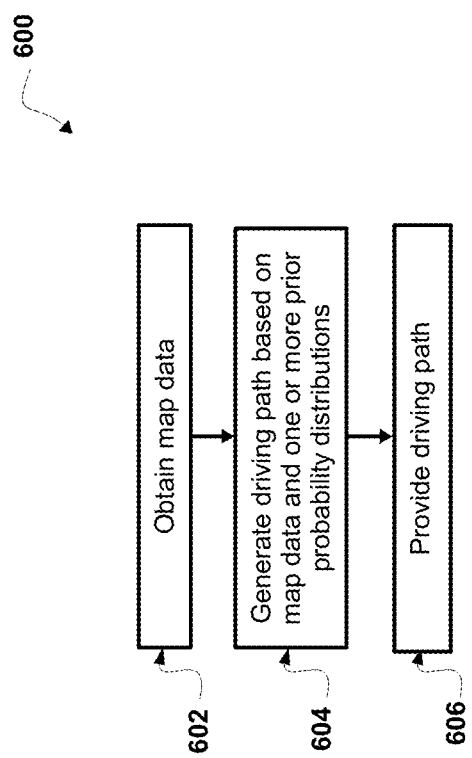
FIG. 6 is a flowchart of a non-limiting embodiment or aspect of a process for generating a driving path.

Referring now to FIG. 6, FIG. 6 is a flowchart of a non-limiting embodiment or aspect of a process 600 for generating a driving path. In some non-limiting embodiments or aspects, one or more of the steps of process 600 are performed (e.g., completely, partially, etc.) by map generation system 102 (e.g., one or more devices of map generation system 102, etc.). In some non-limiting embodiments or aspects, one or more of the steps of process 600 are performed (e.g., completely, partially, etc.) by another device or a group of devices separate from or including map generation system 102, such as one or more device of (e.g., one or more devices of a system of) autonomous vehicle 104.

As shown in FIG. 6, at step 602, process 600 includes obtaining map data. For example, map generation system 102 obtains map data. As an example, map generation system 102 obtains map data associated with the map of the geographic location.

As shown in FIG. 6, at step 604, process 600 includes generating a driving path based on map data and one or more prior probability distributions. For example, map generation system 102 generates a driving path based on map data and one or more prior probability distributions. As an example, map generation system 102 generates the driving path including the one or more trajectories for the autonomous vehicle 104 on the roadway in the map based on the map data and the one or more prior probability distributions. In such an example, map generation system 102 can automatically (e.g., without user input, etc.) generate the driving path including the one or more trajectories for the autonomous vehicle on the roadway in the map based on the map data and the one or more prior probability distributions.

In some non-limiting embodiments or aspects, map generation system 102 automatically generates the driving path based on a machine learning technique (e.g., a pattern recognition technique, a data mining technique, a heuristic technique, a supervised learning technique, an unsupervised learning technique, etc.). For example, map generation system 102 generates a model (e.g., an estimator, a classifier, a prediction model, etc.) based on a machine learning algorithm (e.g., a decision tree algorithm, a gradient boosted decision tree algorithm, a neural network algorithm, a convolutional neural network algorithm, etc.). In such an example, map generation system 102 generates the driving path using the model.

In some non-limiting embodiments or aspects, the one or more prior probability distributions are associated with one or more probability values that correspond to one or more elements of a plurality of elements in a map of the geographic location, and the one or more probability values include one or more probabilities of the one or more objects at one or more positions in the geographic location associated with the one or more elements in the map moving over the one or more motion paths. For example, the one or more prior probability distributions may be associated with, generated from, and/or used to generate a raster heat map evidence layer. As an example, the one or more probability values can further include at least one probability associated with at least one of the following probabilities: one or more predetermined object classes of a plurality of predetermined object classes associated with the one or more objects, one or more velocities associated with the one or more objects, one or more acceleration and/or deceleration rates associated with the one or more objects, one or more orientations associated with the one or more objects, a time of day associated with the one or more motion paths, a date associated with the one or more motion paths, a geographic region of a plurality of geographic regions including the geographic location, or any combination thereof. In such an example, a resulting heat map can produce a probability distribution, e.g., a "prior", for the objects that previously moved in that geographic location in space. The prior probability distribution may be stored in association with the map of the geographic location, for example, for automatic generation of a driving path in a roadway of the geographic location or another different geographic location, for human operators, and/or for autonomous vehicle 104 to use in making informed posterior probability estimates of an intent of an object conditional on the prior probability distribution provided by the map. As an example, map generation system 102 can store raw detections in the sensor data with associated metadata, such as speed/acceleration estimates, orientation, object class, confidence score, and/or the like in a geo-indexed storage mechanism, and from the raw data and associated metadata, use the model to build a collection of heat maps, each of which may be represented as 2D matrix of probability values. In such an example, the heat maps may be stored in a geo-indexed storage mechanism, which may be keyed (e.g., accessed, etc.) by classification (e.g., vehicle, pedestrian, bicyclist, etc.) and/or condition parameterization (e.g., time of day, date, weather, etc.).

In some non-limiting embodiments or aspects, map generation system 102 obtains user input associated with at least one element of the plurality of elements of the map of the geographic location. For example, map generation system 102 can generate the driving path including the one or more trajectories for the autonomous vehicle on the roadway in the map based on the map data, the one or more prior probability distributions, and the user input. In some non-limiting embodiments or aspects, the user input is associated with a first element of the plurality of elements of the map of the geographic location and a second element of the plurality of elements of the map of the geographic location different than the first element, and wherein the driving path is generated on the roadway in the map between the first element and the second element. For example, map generation system 102 can provide an evidence layer (e.g., a raster heat map evidence layer, etc.) to provide evidence for human operators for where driving paths should be drawn in a map of a geographic location. As an example, map generation system 102 may interact with web-tools to assist the human in generating a driving path in the map. In such an example, map generation system 102, in response to the human operator clicking two points in the map, such as the start and end points of a driving path, can utilize the two points as input to generate a spline (or set of splines) (e.g., using a heuristic or neural network which converts the log paths into driving path splines, etc.) which represent a driving path connecting the two points. For example, inside of an intersection, the human operator might click the start and destination lanes, and map generation system 102 can use this as input to filter the one or more prior probability distributions and look only at a region of space between the two lanes. As an example, map generation system 102 may suggest a driving path which connects the two lanes, which the human operator can modify, or map generation system 102 may return a set of potential driving paths which provides the human operator, or the web tools, according to rules or constraints associated with the roadway, with the ability to determine a driving path.

As shown in FIG. 6, at step 606, process 600 includes providing a driving path. For example, map generation system 102 provides a driving path. As an example, map generation system 102 provides the driving path to a human mapper (e.g., via output component 312, etc.) and/or to autonomous vehicle 104.

Figure 7:
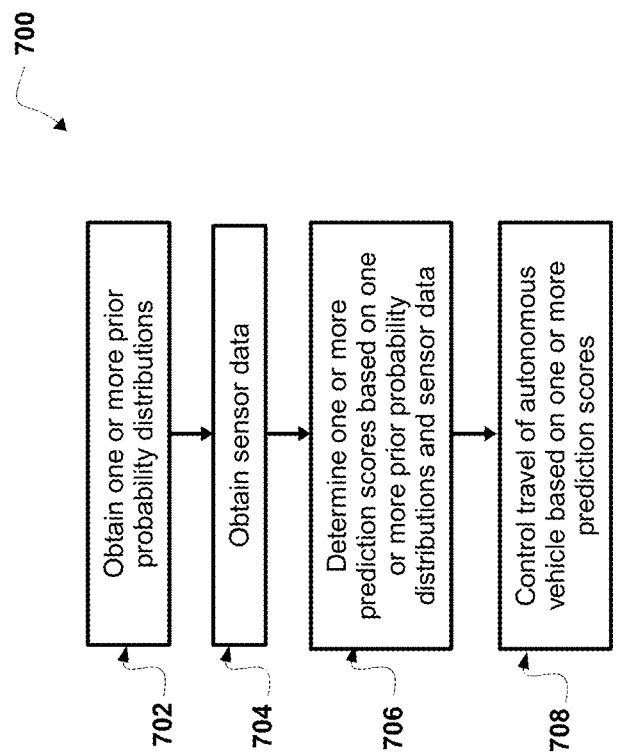
FIG. 7 is a flowchart of a non-limiting embodiment or aspect of a process for controlling travel of an autonomous vehicle.

Referring now to FIG. 7, FIG. 7 is a flowchart of a non-limiting embodiment or aspect of a process 700 for controlling travel of an autonomous vehicle. In some non-limiting embodiments or aspects, one or more of the steps of process 700 are performed (e.g., completely, partially, etc.) by one or more devices of (e.g., one or more devices of a system of) autonomous vehicle 104. In some non-limiting embodiments or aspects, one or more of the steps of process 700 are performed (e.g., completely, partially, etc.) by another device or a group of devices separate from or including autonomous vehicle 104, such as map generation system 102 (e.g., one or more devices of map generation system 102, etc.).

As shown in FIG. 7, at step 702, process 700 includes obtaining one or more prior probability distributions. For example, autonomous vehicle 104 (e.g., vehicle computing system 106, etc.) obtains one or more prior probability distributions. As an example, autonomous vehicle 104 (e.g., vehicle computing system 106, etc.) obtains one or more prior probability distributions of one or more motion paths for one or more objects that previously moved in a geographic location. In such an example, autonomous vehicle 104 (e.g., vehicle computing system 106, etc.) can obtain the one or more prior probability distributions of one or more motion paths for one or more objects that previously moved in a geographic location including a roadway from map generation system 102.

In some non-limiting embodiments or aspects, the one or more prior probability distributions are associated with one or more traversals of the roadway by one or more vehicles before the travel of the autonomous vehicle on the roadway, and wherein the one or more objects moved external to the one or more vehicles during the one or more traversals of the roadway by the one or more vehicles.

As shown in FIG. 7, at step 704, process 700 includes obtaining sensor data. For example, autonomous vehicle 104 (e.g., vehicle computing system 106, etc.) obtains sensor data. As an example, autonomous vehicle 104 (e.g., vehicle computing system 106, etc.) obtains sensor data associated with a detected object in an environment surrounding an autonomous vehicle 104. In such an example, autonomous vehicle 104 (e.g., vehicle computing system 106, etc.) can obtain the sensor data from one or more sensors for detecting objects in an environment surrounding autonomous vehicle 104 (e.g., from sensors 210, etc.).

As shown in FIG. 7, at step 706, process 700 includes determining one or more prediction scores based on one or more prior probability distributions and sensor data. For example, as an example, autonomous vehicle 104 (e.g., vehicle computing system 106, etc.) determines one or more prediction scores based on the one or more prior probability distributions and the sensor data. In some non-limiting embodiments or aspects, the one or more prediction scores include one or more predictions of whether the detected object is moving over at least one motion path of the one or more motion paths.

In some non-limiting embodiments, autonomous vehicle 104 (e.g., vehicle computing system 106, etc.) may use a Bayesian process which updates the one or more prior probability distributions based on the sensor data to determine the one or more prediction scores (e.g., a posterior distribution, etc.). For example, autonomous vehicle 104 can obtain or generate state data for a proximate object to predict one or more future locations and/or one or more future motion paths of the proximate object. As an example, based on the state data (e.g., evidence of where the proximate object has moved and/or is moving, etc.) and the posterior probability of where the proximate object may move in the future, autonomous vehicle 104 predicts a movement of the proximate object. For example, autonomous vehicle 104 can assign one or more posterior probabilities of where the proximate object is predicted or likely to move in the future based on the classification and/or state of the proximate object. In such an example, autonomous vehicle 104 can assign one or more posterior probabilities associated with a jaywalker crossing in the roadway after classifying one or more proximate objects as a pedestrian. For example, autonomous vehicle 104 can assign a posterior probability of when and where the jaywalker (e.g., proximate object, etc.) may cross the roadway. As an example, autonomous vehicle 104 can determine one or more future motion paths of the proximate object based on the posterior probability.

In some non-limiting embodiments or aspects, autonomous vehicle 104 assigns the posterior probability based on a conditional parameter. For example, the posterior probability can be assigned after determining a time of day, a particular date, a particular geographic region and/or location, a season, and/or the like. As an example, autonomous vehicle 104 can assign a posterior probability of when and where a jaywalker is predicted to or is likely to cross a roadway based on determining a time of day (e.g., 2 o'clock PM on a school day, etc.) as autonomous vehicle 104 traverses the roadway (e.g., a roadway in a school zone, etc.).

Further details regarding non-limiting embodiments of step 706 of process 700 are provided below with regard to FIG. 8.

As shown in FIG. 7, at step 708, process 700 includes controlling travel of an autonomous vehicle based on one or more prediction scores. For example, autonomous vehicle 104 (e.g., vehicle computing system 106, etc.) controls travel of autonomous vehicle 104 based on one or more prediction scores. As an example, autonomous vehicle 104 (e.g., vehicle computing system 106, etc.) controls travel of autonomous vehicle 104 on the roadway based on the one or more prediction scores.

In some non-limiting embodiment or aspects, the geographic location associated with the one or more prior probability distributions of the one or more motion paths for the one or more objects that previously moved in the geographic location includes the roadway on which autonomous vehicle 104 (e.g., vehicle computing system 106, etc.) controls travel of autonomous vehicle 104 based on one or more prediction scores. In some non-limiting embodiment or aspects, the geographic location associated with the one or more prior probability distributions of the one or more motion paths for the one or more objects that previously moved in the geographic location may not include the roadway on which autonomous vehicle 104 (e.g., vehicle computing system 106, etc.) controls travels of autonomous vehicle 104 based on one or more prediction scores. For example, vehicle computing system 106 may be agnostic to a geographic region including a geographic location and controls travel of autonomous vehicle 104 in the geographic location based on one or more prior probability distributions associated with another geographic location of the same geographic region.

In some non-limiting embodiments or aspects, autonomous vehicle 104 (e.g., vehicle computing system 106, etc.) controls travel of autonomous vehicle 104 on one or more trajectories of a driving path based on the driving path and/or the one or more prediction scores. For example, vehicle computing system 106 controls travel and one or more functionalities associated with a fully autonomous mode of autonomous vehicle 104 during fully autonomous operation of autonomous vehicle 104 (e.g., controls a device that controls acceleration, controls a device that controls steering, controls a device that controls braking, controls an actuator that controls gas flow, etc.) based on the driving path and/or the one or more prediction scores. For example, motion planning system 232 determines a motion plan that minimizes a cost function that is dependent on the one or more prediction scores. As an example, motion planning system 232 determines a motion plan that minimizes a cost function for controlling the motion of autonomous vehicle 104 on the roadway. In such an example, the one or more prior probability distributions (e.g., an all mover priors signal, etc.) can be utilized onboard autonomous vehicle 104 as a prior probability distribution for vehicle computing system 106 to accurately determine where other objects in the environment surrounding autonomous vehicle 104 are likely to move given how objects have historically moved in that region. For example, the all mover priors signal may be efficiently stored for fast query on autonomous vehicle 104, which may enable vehicle computing system 106 to make iteratively better-informed decisions about how detected objects may move in the environment surrounding autonomous vehicle 104. As an example, the all mover priors signal may predict at t=0 that a detected object has an equal probability of choosing one of three potential motion paths, however, based on an observed or detected movement of the object at t=1, and t=2, vehicle computing system 106 can make an informed decision on which motion path the object is moving along given the one or more prior probability distributions encoded in the all mover priors signal.

In some examples, a pedestrian priors signal including a prior probability distribution of motion paths for pedestrians in an intersection of a relatively large city may include a probability distribution of jaywalkers in the intersection. For example, map generation system 102 may collect sensor data associated with the intersection for building the pedestrian priors signal that includes several jaywalkers that cut across the intersection outside of and/or over the painted-crosswalks for the intersection, and map generation system 102 can build the pedestrian priors signal based on the sensor data. In such an example, map generation system 102 may collect additional sensor data (e.g., updated as more sensor-equipped vehicles travel through a geographic location including the intersection, etc.) and use the additional sensor data to dynamically update the pedestrian priors signal and/or generate a historical representation of various routes jaywalkers use to travel through the intersection. Autonomous vehicle 104 (e.g., vehicle computing system 106, etc.) may use the updated pedestrian priors signal to make a more informed decision about a probability of a jaywalker cutting off autonomous vehicle 104 during autonomous operation.

Figure 8:
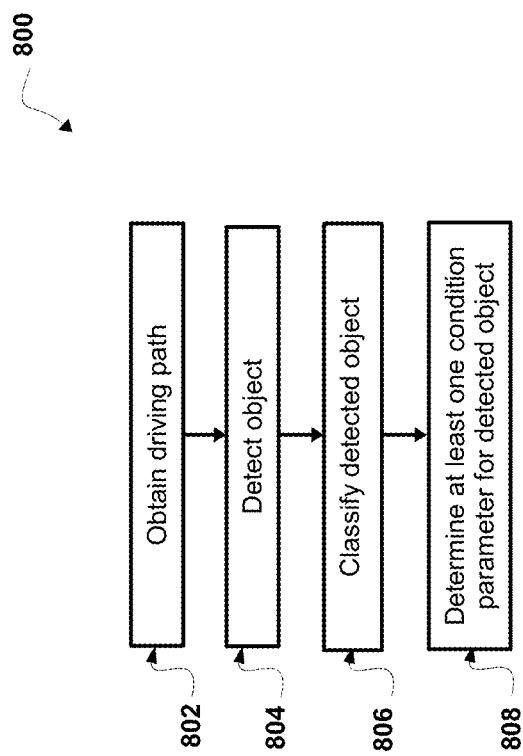
FIG. 8 is a flowchart of a non-limiting embodiment or aspect of a process for controlling travel of an autonomous vehicle.

Referring now to FIG. 8, FIG. 8 is a flowchart of a non-limiting embodiment or aspect of a process 800 for controlling travel of an autonomous vehicle 104. In some non-limiting embodiments or aspects, one or more of the steps of process 800 are performed (e.g., completely, partially, etc.) by one or more devices of (e.g., one or more devices of a system of) autonomous vehicle 104. In some non-limiting embodiments or aspects, one or more of the steps of process 800 are performed (e.g., completely, partially, etc.) by another device or a group of devices separate from or including autonomous vehicle 104, such as map generation system 102 (e.g., one or more devices of map generation system 102, etc.).

As shown in FIG. 8, at step 802, process 800 includes obtaining a driving path. For example, autonomous vehicle 104 (e.g., vehicle computing system 106, etc.) obtains a driving path. As an example, autonomous vehicle 104 (e.g., vehicle computing system 106, etc.) obtains a driving path including one or more trajectories for the autonomous vehicle on the roadway. In such an example, autonomous vehicle 104 (e.g., vehicle computing system 106, etc.) can obtain (e.g., receive, retrieve, etc.) the driving path from map generation system 102.

As shown in FIG. 8, at step 804, process 800 includes detecting an object. For example, autonomous vehicle 104 (e.g., vehicle computing system 106, etc.) detects an object. As an example, autonomous vehicle 104 (e.g., vehicle computing system 106, etc.) may process sensor data from sensor(s) 210 using a model for detecting objects of interest (e.g., the detected object, a moving object, an object capable of moving, etc.) within the sensor data (e.g., LIDAR data, etc.). In such an example, autonomous vehicle 104 (e.g., vehicle computing system 106, etc.) may include a model as described herein with respect to step 404 of FIG. 4 and/or FIG. 5 (e.g., a detector model configured and/or trained to generate a bounding shape and/or parameters used to define a bounding shape and/or related parameters for each cell or for a subset of selected cells, the LiCNN model, etc.) for detecting objects of interest within the sensor data.

As shown in FIG. 8, at step 806, process 800 includes classifying a detected object. For example, autonomous vehicle 104 (e.g., vehicle computing system 106, etc.) classifies a detected object. As an example, autonomous vehicle 104 (e.g., vehicle computing system 106, etc.) can classify the detected object within at least one predetermined object class of the plurality of predetermined object classes.

In some non-limiting embodiments or aspects, the one or more prior probability distributions are associated with one or more predetermined object classes of a plurality of predetermined object classes in which the one or more objects are classified. For example, the one or more prediction scores can be determined based on the one or more predetermined object classes of the plurality of predetermined object classes in which the one or more objects are classified and the at least one predetermined object class of the plurality of predetermined object classes in which the detected object is classified. As an example, autonomous vehicle 104 (e.g., vehicle computing system 106, etc.) may include a model as described herein with respect to step 404 of FIG. 4 and/or FIG. 5 (e.g., a model including a classification for cells within one or more representations of sensor data, the LiCNN model, etc.) that receives, as input, the sensor data, and provides, as output, a class prediction for each cell as corresponding to a particular predetermined class of object (e.g., a vehicle, a pedestrian, a bicycle, and/or no object, etc.) of a plurality of predetermined classes of objects and/or a probability score associated with the class prediction for each cell.

As shown in FIG. 8, at step 808, process 800 includes determining at least at least one condition parameter for a detected object. For example, autonomous vehicle 104 (e.g., vehicle computing system 106, etc.) can determine at least one condition parameter for a detected object. As an example, autonomous vehicle 104 (e.g., vehicle computing system 106, etc.) can determine, for the detected object, at least one detected object probability associated with the at least one condition parameter.

In some non-limiting embodiments or aspects, autonomous vehicle 104 (e.g., vehicle computing system 106, etc.) can determine the one or more prediction scores based on the at least one prior probability associated with the at least one condition parameter and the at least one detected object probability associated with the at least one condition parameter. As an example, autonomous vehicle 104 (e.g., vehicle computing system 106, etc.) may include a model as described herein with respect to step 404 of FIG. 4 and/or FIG. 5 (e.g., a model including a condition parameterization for cells within one or more representations of sensor data, the LiCNN model, etc.) that receives, as input, the sensor data, and provides, as output, a condition parameter prediction for each cell as corresponding to a particular condition parameter associated with the cell (and/or an object thereof, etc.), and/or a probability score associated with the condition parameter prediction for each cell (and/or an object thereof, etc.).

Referring now to FIGS. 9A-9E, FIGS. 9A-9E are diagrams of an overview of a non-limiting embodiment of an implementation 900 relating to one or more processes disclosed herein. As shown in FIGS. 9A-9E, implementation 900 includes map generation system 902, autonomous vehicle 904 including vehicle computing system 906 and vehicle controls 940. In some non-limiting embodiments or aspects, map generation system 902 can be the same or similar to map generation system 102. In some non-limiting embodiments or aspects, autonomous vehicle 904 can be the same or similar to autonomous vehicle 104. In some non-limiting embodiments or aspects, vehicle computing system 906 can be the same or similar to vehicle computing system 106. In some non-limiting embodiments or aspects, vehicle controls 940 can be the same or similar to vehicle controls 240.

Figure 9B:
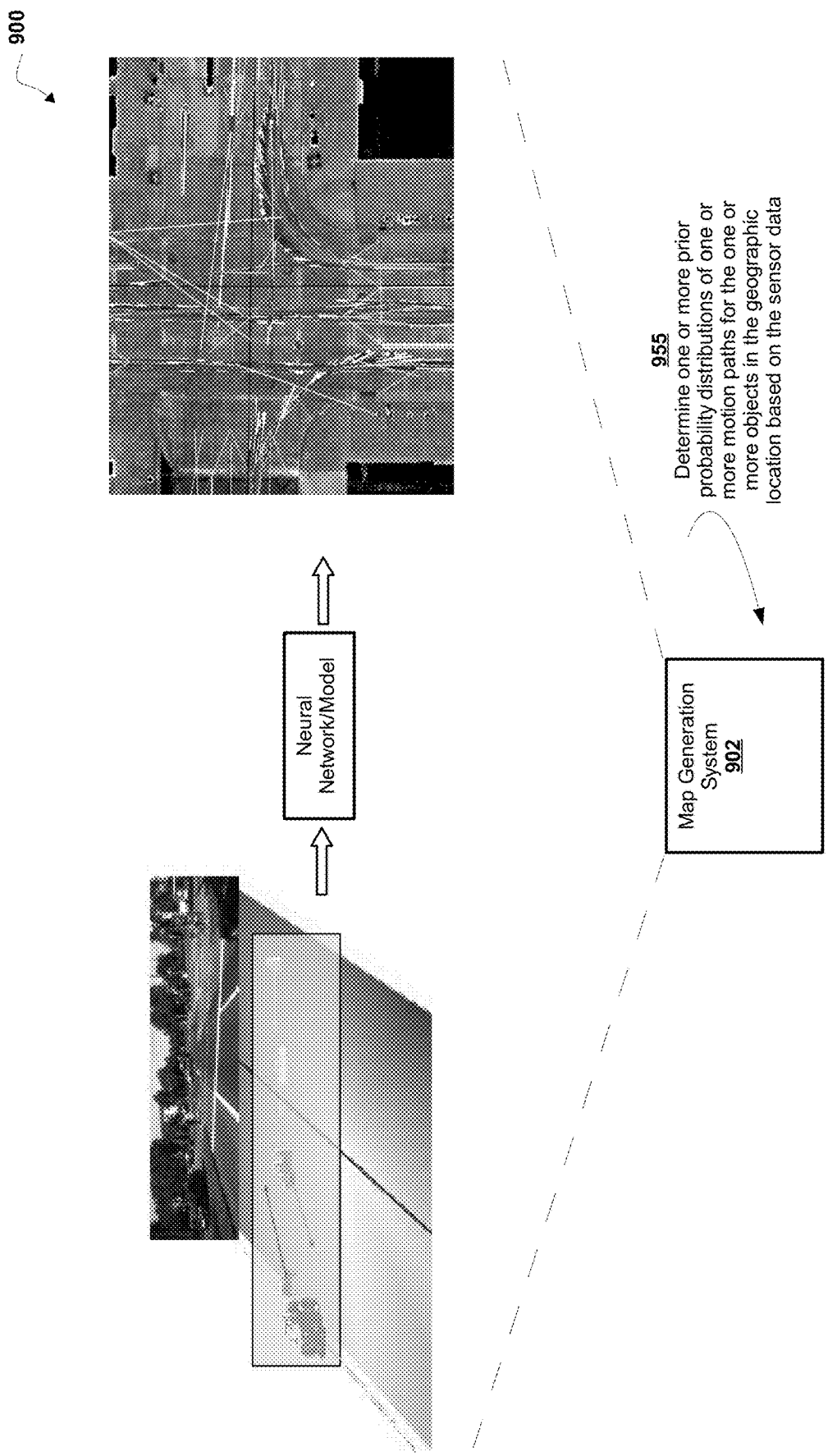
Figure 9C:
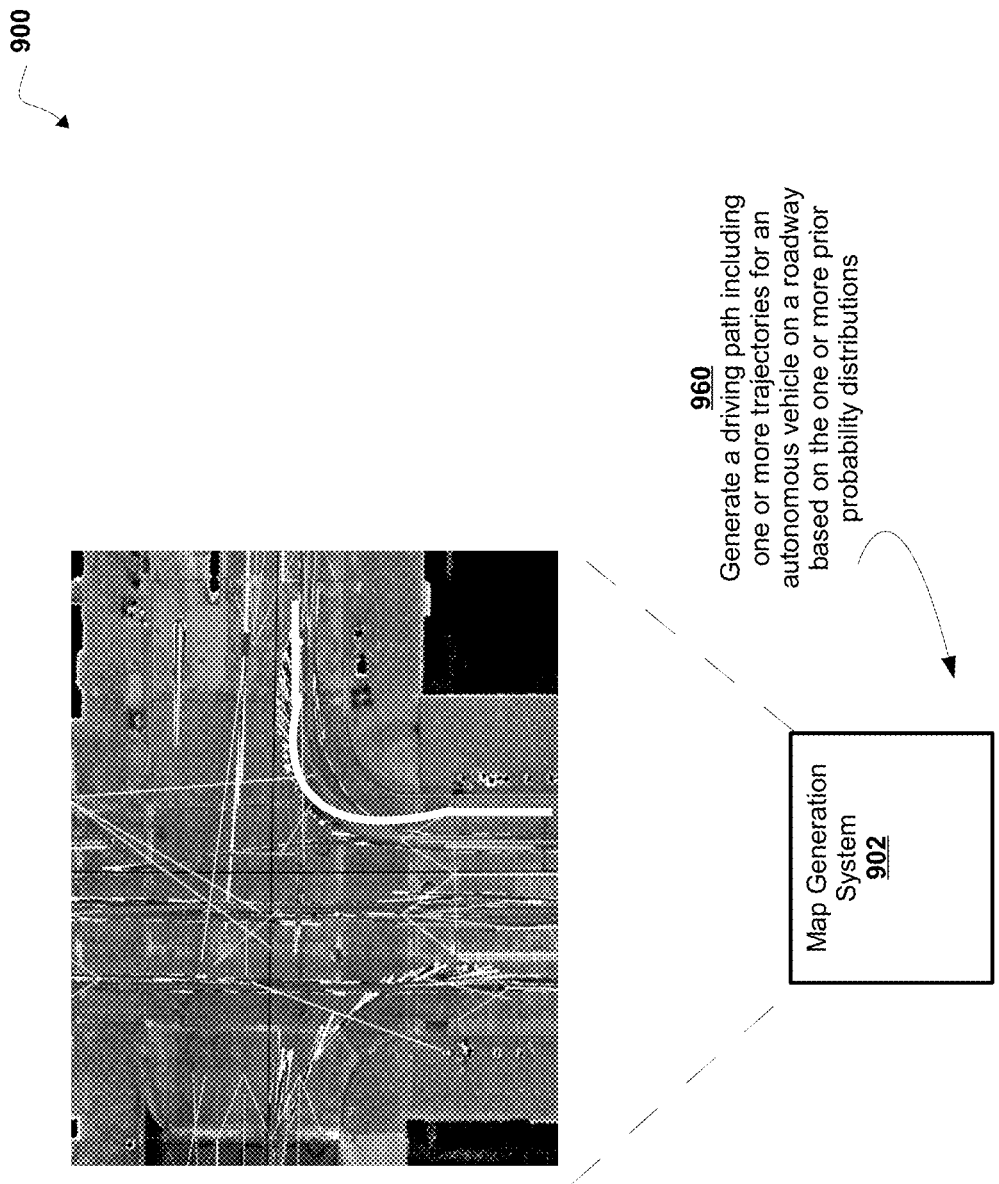

As shown by reference number 950 in FIG. 9A, map generation system 902 obtains sensor data associated with one or more objects that previously moved in a geographic location including a roadway. As shown by reference number 955 in FIG. 9B, map generation system 902 determines one or more prior probability distributions of one or more motion paths for the one or more objects in the geographic location based on the sensor data. As shown by reference number 960 in FIG. 9C, map generation system 902 generates a driving path including one or more trajectories for an autonomous vehicle on the roadway based on the one or more prior probability distributions.

Figure 9D:
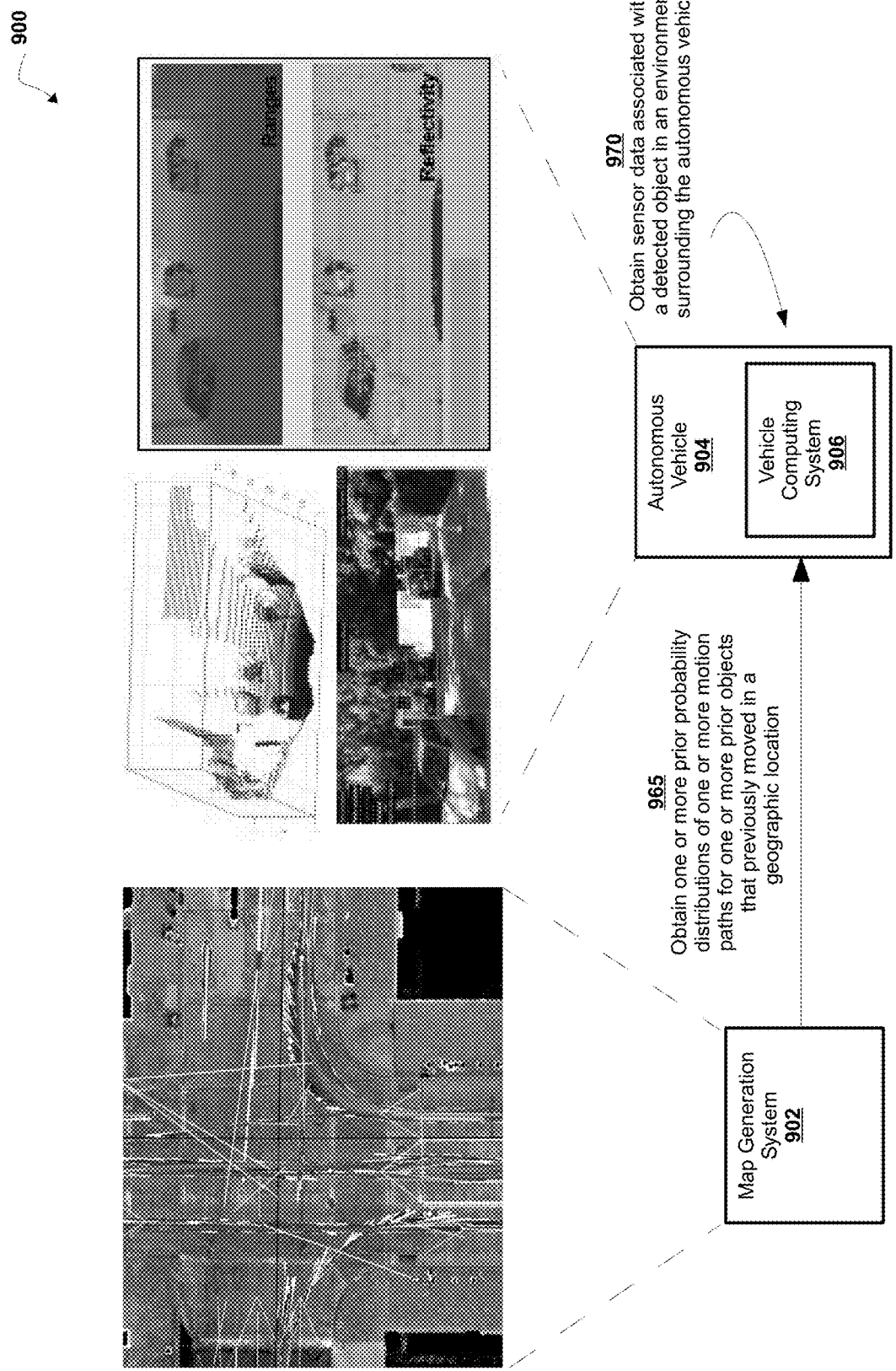
Figure 9E:
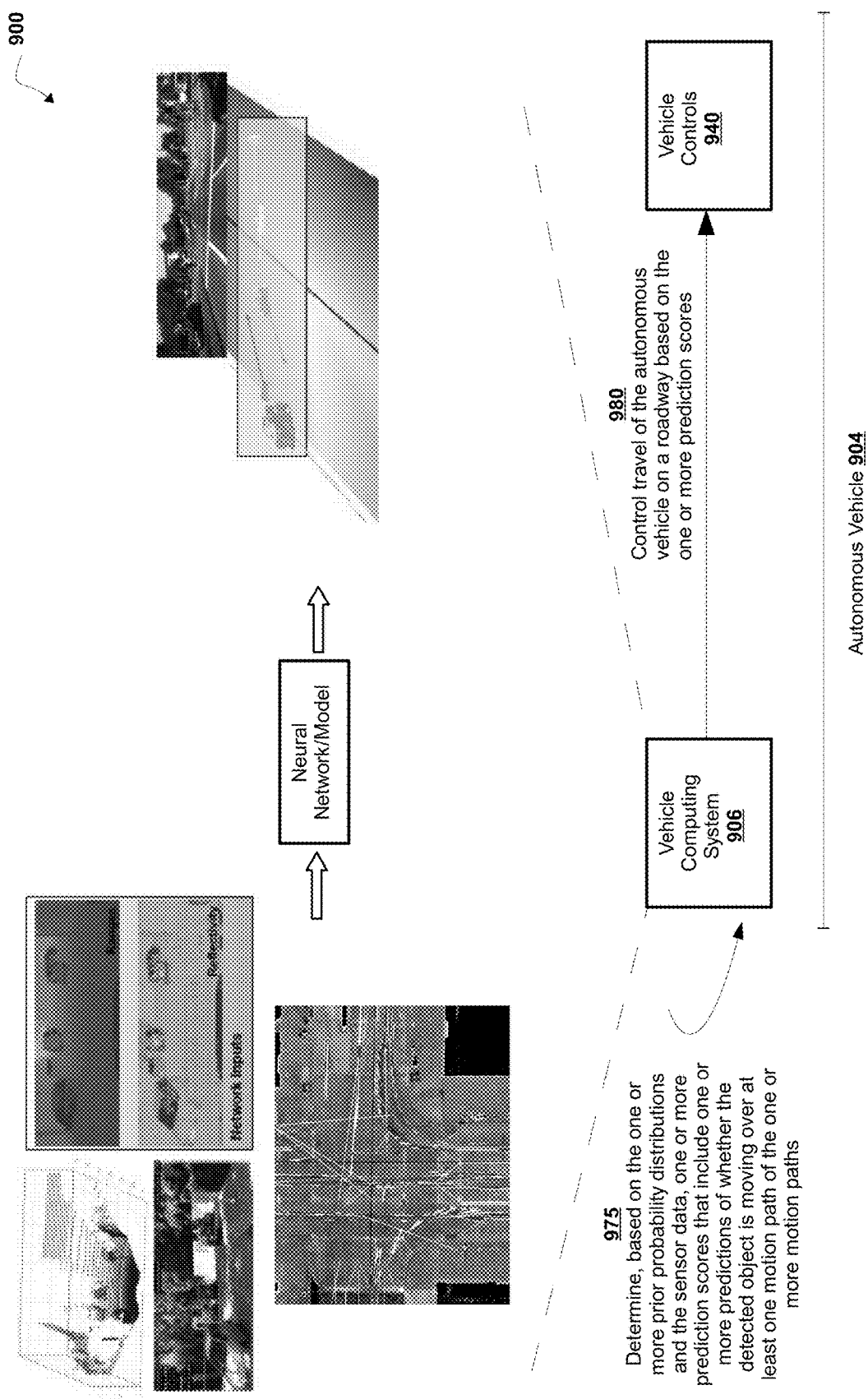

As shown by reference number 965 in FIG. 9D, autonomous vehicle 904 (e.g., vehicle computing system 906, etc.) obtains one or more prior probability distributions of one or more motion paths for one or more objects that previously moved in a geographic location including a roadway. As shown by reference number 970 in FIG. 9D, autonomous vehicle 904 (e.g., vehicle computing system 906, etc.) obtains sensor data associated with a detected object in an environment surrounding an autonomous vehicle. As shown by reference number 975 in FIG. 9E, vehicle computing system 906 determines one or more prediction scores based on the one or more prior probability distributions and the sensor data, wherein the one or more prediction scores include one or more predictions of whether the detected object is moving over at least one motion path of the one or more motion paths. As shown by reference number 980 in FIG. 9D, vehicle computing system 906 controls travel of the autonomous vehicle on the roadway (e.g., via vehicle controls 940, etc.) based on the one or more prediction scores.

Figure 10:
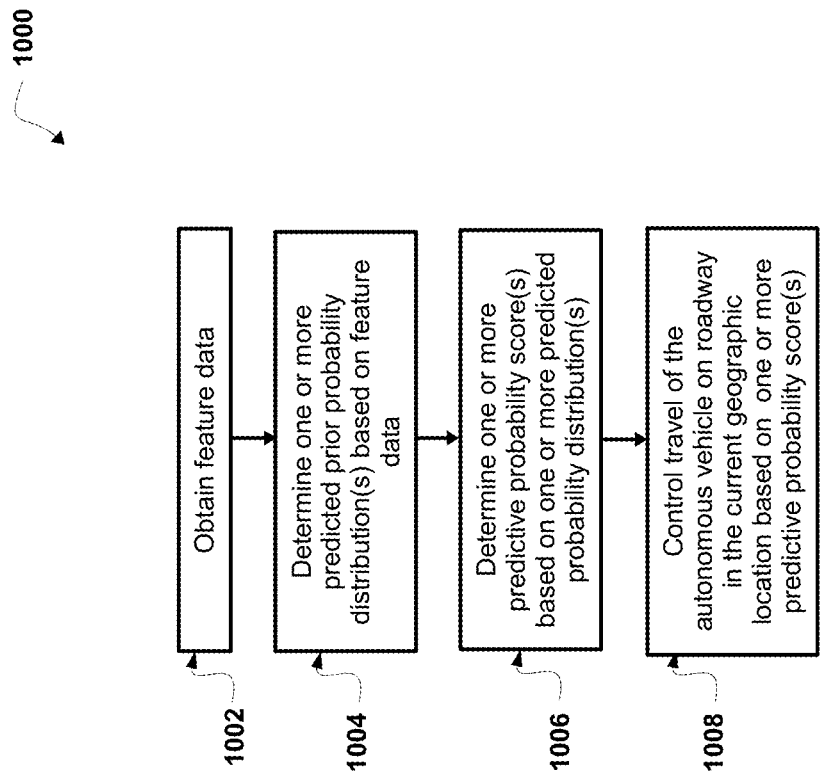
FIG. 10 is a flowchart of a non-limiting embodiment or aspect of a process for controlling travel of an autonomous vehicle.

Referring now to FIG. 10, FIG. 10 is a flowchart of a non-limiting embodiment or aspect of a process 1000 for controlling travel of an autonomous vehicle. In some non-limiting embodiments or aspects, one or more of the steps of process 1000 are performed (e.g., completely, partially, etc.) by one or more devices of (e.g., one or more devices of a system of) autonomous vehicle 104. In some non-limiting embodiments or aspects, one or more of the steps of process 1000 are performed (e.g., completely, partially, etc.) by another device or a group of devices separate from or including autonomous vehicle 104, such as map generation system 102 (e.g., one or more devices of map generation system 102, etc.).

As shown in FIG. 10, at step 1002, process 1000 includes obtaining feature data. For example, autonomous vehicle 104 (e.g., vehicle computing system 106, etc.) obtains feature data. As an example, autonomous vehicle 104 (e.g., vehicle computing system 106, etc.) obtains feature data associated with a detected object in an environment surrounding an autonomous vehicle 104. In some non-limiting embodiments or aspects, autonomous vehicle 104 (e.g., vehicle computing system 106, etc.) obtains feature data including sensor data or map data. For example, the feature data associated with the current geographic location includes sensor data that is obtained from the one or more sensors while traversing the geographic location, map data associated with a map of the current geographic location, or in other embodiments, may include feature data associated with one or more other geographic locations (e.g., sensor data that is obtained from the one or more sensors while traversing the geographic location, map data associated with a map of the current geographic location, etc.). Autonomous vehicle 104 can obtain sensor data from one or more sensors for detecting objects in an environment surrounding autonomous vehicle 104 (e.g., from sensors 210, etc.), or in other examples, map data from a computing system (e.g., map generation system 102, etc.) associated with the map of the geographic location (e.g., a current geographic location, etc.).

In some non-limiting embodiments or aspects, autonomous vehicle 104 obtains feature data, where the characteristic feature includes at least one of a roadway, an intersection, a park, a roadway defect, a bridge, a bump, a depression, a landscape, an embankment, a barrier, a static object of a roadway, a sign, a curb, a building, or any combination thereof. For example, the feature data may include sensor data or map data for determining an object in a roadway (e.g., information about the behavior of an object in the roadway, information about the behavior of other objects in relation to the object in the roadway, etc.), such as an intersection (e.g., a marking, signs, curbs, or some other indication of a configuration the intersection, etc.) or other static object, like a zoo (e.g., a sign, a landmark, a curb, etc.) where a motion path may change based on the characteristic feature. In some examples, a probability distribution associated with a characteristic feature does not exist.

As shown in FIG. 10, at step 1004, process 1000 includes determining one or more predicted probability distributions. For example, autonomous vehicle 104 (e.g., vehicle computing system 106, etc.) determines one or more predicted probability distributions. As an example, autonomous vehicle 104 (e.g., vehicle computing system 106, etc.) determines one or more predicted probability distributions of one or more predicted motion paths for one or more objects that may move in the current geographic location. In such an example, autonomous vehicle 104 determines one or more predicted probability distributions of one or more predicted motion paths for one or more objects in the current geographic location based on (i) the feature data associated with the current geographic location, (ii) one or more prior probability distributions of one or more prior motion paths for one or more other objects that previously moved in one or more other geographic locations, and (iii) feature data associated with the one or more other geographic locations. In such an example, the feature data associated with the one or more other geographic locations includes at least one characteristic feature corresponding to at least one of the characteristic features of the current geographic location. In such an example, autonomous vehicle 104 (e.g., vehicle computing system 106, etc.) can determine the one or more predicted probability distributions of one or more motion paths for one or more objects that may move in the geographic location by determining the one or more prior probability distributions of the one or more prior motion paths for the one or more other objects that previously moved in one or more other geographic locations.

Continuing with FIG. 10, in some non-limiting embodiments or aspects, the one or more prior probability distributions are associated with one or more traversals of a different roadway in one or more other geographic locations by one or more vehicles before the travel of the autonomous vehicle in the current geographic location. In such an example, the one or more objects were detected external to the one or more vehicles during the one or more traversals by the one or more vehicles. Autonomous vehicle 104 (e.g., vehicle computing system 106, etc.) may use the feature data (e.g., the feature data associated with the current geographic location, the feature data associated with the one or more other geographic locations, etc.) to determine a predicted probability distribution for the current geographic location based on other locations having the same features, or in other examples, a meeting a threshold similarity between the features.

In some non-limiting embodiments or aspects, autonomous vehicle 104 determines the one or more predicted probability distributions by comparing the feature data associated with the current geographic location to the feature data associated with the one or more other geographic locations. For example, autonomous vehicle 104 may classify the characteristic features of the current geographic location and the characteristic features of the one or more other geographic locations. In such an example, autonomous vehicle 104 may compare classifiers to determine a match or similar geographic location. Autonomous vehicle may compare feature data based on a machine learning technique (e.g., a pattern recognition technique, a data mining technique, a heuristic technique, a supervised learning technique, an unsupervised learning technique, etc.). For example, autonomous vehicle 104 may use a model (e.g., an estimator, a classifier, a prediction model, etc.) to determine a predictive priority distribution based on a machine learning algorithm (e.g., a decision tree algorithm, a gradient boosted decision tree algorithm, a neural network algorithm, a convolutional neural network algorithm, etc.) to classify and/or compare two geographic locations. In such an example, autonomous vehicle 104 may compare features associated with a park (e.g., a zoo, etc.) to features in other geographic locations associated with a zoo, to determine a likelihood of particular moving paths around a zoo. In such an example, one or more prior probability distributions from the other geographic locations may be used for controlling the autonomous vehicle 104 around the zoo in the current geographic location.

In some non-limiting embodiments or aspects, the prior probability distribution may be stored in association with the map of the geographic location, for example, for automatic generation of a driving path in another different geographic location or to use in making informed predictive probability estimates of an intent of an object. As an example, map generation system 102 can store raw detections in the sensor data with associated metadata, such as speed/acceleration estimates, orientation, object class, confidence score, and/or the like in a geo-indexed storage mechanism, and from the raw data and associated metadata, use a model to match (e.g., compare, classify, etc.) a current geographic location with one or more other geographic locations, or in other examples, the heat maps may be stored in a geo-indexed storage mechanism, which may be keyed (e.g., accessed, etc.) by classification (e.g., vehicle, pedestrian, bicyclist, etc.) and/or condition parameterization (e.g., time of day, date, weather, intersection type, business type, etc.). In other alternatives, feature data may include objects indicating information about a geographic location, for example, a sign indicating an approaching park (e.g., adjacent, close, etc.), a landscape indicating a beach, hills or mountains indicating a ski resort, a parking lot indicating a sports event, and/or the like. LIDAR data, RADAR data, photographic data, and/or the like that describes or explains the surrounding environment of autonomous vehicle 104 can facilitate a feature match between a current geographic location and one or more other geographic locations.

As shown in FIG. 10, at step 1006, process 1000 includes determining one or more predictive probability scores based on one or more predicted probability distributions. For example, autonomous vehicle 104 (e.g., vehicle computing system 106, etc.) determines one or more predictive probability scores based on one or more predicted probability distributions. In some non-limiting embodiments or aspects, the one or more prediction scores include one or more predictions of whether a detected object is moving over at least one motion path of the one or more motion paths, or in other embodiments, whether an undetected object is likely to move over at least one motion path of the one or more motion paths. As an example, autonomous vehicle 104 determines one or more predictive probability scores based on the one or more predicted probability distributions, wherein the one or more predictive probability scores include one or more predictions of whether an object is moving over the one or more predicted motion paths in the current geographic location.

In some non-limiting embodiments or aspects, the predicted probability distributions provide an inference about a moving path for an object or a geographic location, such as whether a jaywalker will suddenly appear cutting off an autonomous vehicle, or whether the current geographic area presents any interesting, unexpected, or undocumented traversals (e.g., an unusual crossing of a complicated intersection, etc.) to account for during autonomous operation. In such an example, autonomous vehicle 104 can determine when and where the jaywalker (e.g., proximate object, etc.) may cross the roadway. As an example, autonomous vehicle 104 can determine one or more future motion paths of the jaywalker based on the predictive probability scores. For example, the one or more predictive probability scores include one or more predictions about where the object not yet located in the current geographic location may move when it enters the current geographic location. This can allow an autonomous vehicle to predict the motion of objects that the autonomous vehicle has not detected within its environment (e.g., at least not yet at a current time) based on objects that have been detected and tracked in previously traversed environments that are similar (e.g., in type, etc.) to the current environment.

In some non-limiting embodiments or aspects, autonomous vehicle 104 assigns the predictive probability scores based on a conditional parameter. For example, the predictive probability scores can be assigned after determining a time of day, a particular date, a particular geographic region and/or location, a season, and/or the like, to refine the predictive probability scores. As an example, autonomous vehicle 104 can influence a predictive probability score of when and where a jaywalker is predicted to or is likely to cross a roadway based on determining a time of day (e.g., 2 o'clock PM on a school day, etc.), a weather condition (e.g., snow, rain, sleet, etc.), a time of year, an intersection type, and/or the like, as autonomous vehicle 104 traverses the roadway (e.g., a roadway in a school zone, etc.). In such an example, the predictive probability scores may be tuned or filtered for situational awareness to define relevant predictive probability scores.

As shown in FIG. 10, at step 1008, process 1000 includes controlling travel of an autonomous vehicle based on one or more predictive probability scores. For example, autonomous vehicle 104 (e.g., vehicle computing system 106, etc.) controls travel of autonomous vehicle 104 based on one or more predictive probability scores. As an example, autonomous vehicle 104 (e.g., vehicle computing system 106, etc.) controls travel of autonomous vehicle 104 on the roadway based on the one or more predictive probability scores.

In some non-limiting embodiment or aspects, the geographic location associated with the one or more prior probability distributions of the one or more motion paths for the one or more objects that previously moved in the geographic location may not include the roadway on which autonomous vehicle 104 (e.g., vehicle computing system 106, etc.) controls travels of autonomous vehicle 104 based on one or more prediction scores. For example, vehicle computing system 106 may be agnostic to a geographic region including a geographic location and controls travel of autonomous vehicle 104 in the geographic location based on one or more prior probability distributions associated with another geographic location.

In some non-limiting embodiments or aspects, autonomous vehicle 104 (e.g., vehicle computing system 106, etc.) controls travel of autonomous vehicle 104 on one or more trajectories of a driving path based on the driving path and/or the one or more predictive probability scores. For example, vehicle computing system 106 controls travel and one or more functionalities associated with a fully autonomous mode of autonomous vehicle 104 during fully autonomous operation of autonomous vehicle 104 (e.g., controls a device that controls acceleration, controls a device that controls steering, controls a device that controls braking, controls an actuator that controls gas flow, etc.) based on the driving path and/or the one or more predictive probability scores. For example, motion planning system 232 determines a motion plan that minimizes a cost function that is dependent on the one or more predictive probability scores. As an example, motion planning system 232 determines a motion plan that minimizes a cost function for controlling the motion of autonomous vehicle 104 on the roadway. In such an example, the one or more predictive probability distributions (e.g., an all mover priors signal, etc.) can be utilized onboard autonomous vehicle 104 as a prior probability distribution for vehicle computing system 106 to accurately determine where other objects in the environment surrounding autonomous vehicle 104 are likely to move given how objects have historically moved in that region, or in other embodiments, to determine where other objects that may yet not exist in the environment surrounding autonomous vehicle 104 are likely to move given how objects have historically moved in other regions having characteristic features that match the current region (e.g., the geographic location, etc.). In such an example, the one or more predictive probability distributions (e.g., an all mover priors signal, etc.) can be utilized onboard autonomous vehicle 104 as a prior probability distribution for vehicle computing system 106 to accurately determine where other objects in the environment or not in the environment surrounding autonomous vehicle 104 are likely to move given how objects have historically moved in that region. For example, a predictive priority signal may be efficiently stored for fast query on autonomous vehicle 104, which may enable vehicle computing system 106 to make iteratively better-informed decisions about how detected objects may move in the environment surrounding autonomous vehicle 104. As an example, the all mover priors signal may predict at t=0 that a detected object has an equal probability of choosing one of three potential motion paths, however, based on an observed or detected movement of the object at t=1, and t=2, vehicle computing system 106 can make an informed decision on which motion path the object is moving along given the one or more predictive probability distributions encoded in the predictive probability signal (e.g., of an AV map, a map database, etc.).

In some examples, a pedestrian predictive prior signal including a prior probability distribution of motion paths for pedestrians in an intersection of a relatively large city may include a probability distribution of jaywalkers in the intersection. For example, map generation system 102 may collect sensor data associated with the intersection for building the pedestrian predictive prior signal that includes several jaywalkers that cut across the intersection outside of and/or over the painted-crosswalks for the intersection (e.g., or vehicles that cut across the intersection outside of the painted roadway lines, etc.), and map generation system 102 can build the pedestrian predictive prior signal based on the sensor data.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
    obtaining, with a computing system comprising one or more processors, sensor data captured by at least one sensor of an autonomous vehicle at a geographic location;
    determining, with the computing system, that at least a portion of the sensor data corresponds to a first object in an object class, the object class comprising moving objects at the geographic location;
    determining, with the computing system, one or more prior probability distributions of one or more motion paths for the first object, the one or more prior probability distributions being specific to the geographic location, and the determining of the one or more prior probability distributions being based at least in part on the geographic location and at least in part on previously-observed motion of objects of the object class at the geographic location;
    generating, with the computing system, a driving path including one or more trajectories for the autonomous vehicle on a roadway based on the one or more prior probability distributions; and
    controlling travel of the autonomous vehicle on the driving path.

2. The computer-implemented method of claim 1, wherein determining the one or more prior probability distributions further comprises:
    detecting a plurality of objects in the geographic location based on the sensor data; and
    identifying the first object in the object class from the plurality of objects based on the sensor data.

3. The computer-implemented method of claim 1, wherein the one or more prior probability distributions are determined based on at least one prior probability associated with at least one condition parameter of the following plurality of condition parameters: one or more velocities associated with the one or more objects, one or more acceleration and/or deceleration rates associated with the first object, one or more orientations associated with the first object, a time of day associated with the sensor data, a date associated with the sensor data, a geographic region of a plurality of geographic regions including the geographic location, or any combination thereof.

4. The computer-implemented method of claim 1, wherein the one or more prior probability distributions are associated with one or more probability values that correspond to one or more elements of a plurality of elements in a map of the geographic location, and wherein the one or more probability values include one or more probabilities of the first object at one or more positions in the geographic location associated with the one or more elements in the map moving over the one or more motion paths.

5. The computer-implemented method of claim 4, wherein the one or more probability values further include at least one probability associated with at least one of the following: one or more velocities associated with the first object, one or more acceleration and/or deceleration rates associated with the first object, one or more orientations associated with the first object, a time of day associated with the one or more motion paths, a date associated with the one or more motion paths, a geographic region of a plurality of geographic regions including the geographic location, or any combination thereof.

6. The computer-implemented method of claim 4, further comprising:
obtaining, with the computing system, map data associated with the map of the geographic location; and
generating, with the computing system, the driving path including the one or more trajectories for the autonomous vehicle on the roadway in the map based on the map data and the one or more prior probability distributions.

7. The computer-implemented method of claim 6, further comprising:
obtaining, with the computing system, user input associated with at least one element of the plurality of elements of the map of the geographic location; and
generating, with the computing system, the driving path including the one or more trajectories for the autonomous vehicle on the roadway in the map based on the map data, the one or more prior probability distributions, and the user input.

8. The computer-implemented method of claim 7, wherein the user input is associated with a first element of the plurality of elements of the map of the geographic location and a second element of the plurality of elements of the map of the geographic location different than the first element, and wherein the driving path is generated on the roadway in the map between the first element and the second element.

9. A computing system comprising:
one or more processors programmed and/or configured to:
obtain sensor data captured by at least one sensor of an autonomous vehicle at a geographic location;
determine that at least a portion of the sensor data corresponds to a first object in an object class, the object class comprising moving objects in the geographic location;
determine one or more prior probability distributions of one or more motion paths for the first object, the one or more prior probability distributions being specific to the geographic location, and the determining of the one or more prior probability distributions being based at least in part on the geographic location and at least in part on previously-observed motion of objects of the object class at the geographic location;
generate a driving path including one or more trajectories for the autonomous vehicle on a roadway based on the one or more prior probability distributions; and
controlling travel of the autonomous vehicle on the driving path.

10. The computing system of claim 9, wherein the one or more processors are further programmed and/or configured to determine the one or more prior probability distributions by:
detecting a plurality of objects based on the sensor data; and
identifying the first object in the object class from the plurality of objects based on the sensor data.

11. The computing system of claim 9, wherein the one or more prior probability distributions are determined based on at least one prior probability associated with at least one condition parameter of the following plurality of condition parameters: one or more velocities associated with the first object, one or more acceleration and/or deceleration rates associated with the first object, one or more orientations associated with the first object, a time of day associated with the sensor data, a date associated with the sensor data, a geographic region of a plurality of geographic regions including the geographic location, or any combination thereof.

12. An autonomous vehicle comprising:
one or more sensors for detecting objects in an environment surrounding the autonomous vehicle; and
a vehicle computing system comprising one or more processors, wherein the vehicle computing system is programmed and/or configured to:
obtain feature data associated with a current geographic location surrounding the autonomous vehicle, the feature data including characteristic features of the current geographic location;
determine one or more predicted probability distributions of one or more predicted motion paths for a first object in the current geographic location based on (i) the feature data associated with the current geographic location, (ii) one or more prior probability distributions of one or more prior motion paths for one or more other objects previously-observed at the current geographic location, and (iii) feature data associated with the one or more other geographic locations, the feature data associated with one or more other geographic locations including characteristic features corresponding to the characteristic features of the current geographic location, the one or more predicted probability distributions being specific to the geographic location;
determine one or more predictive probability scores based on the one or more predicted probability distributions, wherein the one or more predictive probability scores include one or more predictions of whether an object is moving over the one or more predicted motion paths in the current geographic location; and
control travel of the autonomous vehicle on a roadway in the current geographic location based on the one or more predictive probability scores.

13. The autonomous vehicle of claim 12, wherein the feature data associated with the current geographic location includes sensor data obtained from the one or more sensors.

14. The autonomous vehicle of claim 12, wherein the feature data associated with the current geographic location includes map data associated with a map of the current geographic location.

15. The autonomous vehicle of claim 12, wherein determining the one or more predictive probability distributions includes classifying the characteristic features of the current geographic location and the characteristic features of the one or more other geographic locations.

16. The autonomous vehicle of claim 12, wherein the characteristic features includes at least one of the following: a roadway marking, an intersection, a park, a roadway defect, a bridge, a bump, a depression, a landscape, an embankment, a barrier, a static object of a roadway, a sign, a curb, a building, or any combination thereof.

17. The autonomous vehicle of claim 12, wherein the one or more predicted probability distributions of the one or more predicted motion paths includes a probability distribution for an object that is not yet located in the current geographic location.

18. The autonomous vehicle of claim 12, wherein the one or more predictive probability scores include one or more predictions about where the object not yet located in the current geographic location may move when it enters the current geographic location.

* * * * *

UNITED STATES PATENT AND TRADEMARK OFFICE
CERTIFICATE OF CORRECTION

| | |
|---|---|
| PATENT NO. | : 11,427,225 B2 |
| APPLICATION NO. | : 16/727654 |
| DATED | : August 30, 2022 |
| INVENTOR(S) | : Mehta et al. |

It is certified that error appears in the above-identified patent and that said Letters Patent is hereby corrected as shown below:

On the Title Page

In Item (72), in "Inventors", in Column 1, Line 4, delete "Pittlsburgh," and insert --Pittsburgh,-- therefor Signed and Sealed this
Eighth Day of August, 2023

Katherine Kelly Vidal
*Director of the United States Patent and Trademark Office*